United States Patent
Bosco et al.

(10) Patent No.: US 9,077,873 B2
(45) Date of Patent: Jul. 7, 2015

(54) COLOR FILTER ARRAY DEFECT CORRECTION

(71) Applicant: STMicroelectronics S.r.l., Agrate Brianza (IT)

(72) Inventors: Angelo Bosco, Giarre (IT); Arcangelo Ranieri Bruna, San Pietro Clarenza (IT); Davide Giacalone, Misterbianco (IT)

(73) Assignee: STMICROELECTRONICS S.R.L., Agrate Brianza (IL)

( * ) Notice: Subject to any disclaimer, the term of this patent is extended or adjusted under 35 U.S.C. 154(b) by 123 days.

(21) Appl. No.: 13/722,949

(22) Filed: Dec. 20, 2012

(65) Prior Publication Data
US 2013/0162871 A1 Jun. 27, 2013

(30) Foreign Application Priority Data
Dec. 23, 2011 (IT) .................. VI2011A0336

(51) Int. Cl.

| | |
|---|---|
| *G03B 13/00* | (2006.01) |
| *H04N 5/232* | (2006.01) |
| *H04N 5/217* | (2011.01) |
| *G06T 5/00* | (2006.01) |

(Continued)

(52) U.S. Cl.
CPC .... *H04N 5/2176* (2013.01); *G06T 2207/20012* (2013.01); *G06T 5/005* (2013.01); *G06T 2207/10024* (2013.01); *H04N 5/367* (2013.01); *H04N 9/045* (2013.01)

(58) Field of Classification Search
USPC ................... 348/241, 243, 246, 247
See application file for complete search history.

(56) References Cited

U.S. PATENT DOCUMENTS 7,209,168 B2 * 4/2007 Post .......................... 348/246
2005/0276510 A1 12/2005 Bosco et al.
(Continued)

FOREIGN PATENT DOCUMENTS

EP    2 222 076 A1    8/2010

OTHER PUBLICATIONS

Bosco et al., "Signal dependent raw image denoising using sensor noise characterization via multiple acquisitions," Proc. SPIE7537, Digital Photography VI, San Jose, California, Jan. 17, 2010, 10 pages.

(Continued)

*Primary Examiner* — Yogesh Aggarwal
(74) *Attorney, Agent, or Firm* — Seed IP Law Group PLLC

(57) ABSTRACT

Image defects in digital images are easily detectable by the human eye but may be difficult to detect in a computer-implemented fashion. In an embodiment of a digital-image-acquisition device, defects are removed on the CFA domain before color interpolation takes place. In order to allow cancellation of couplets of defective pixels, a two pass embodiment is presented. Such embodiment presents methods and systems that can remove both couplets and singlets without damaging the image. The system includes a ring corrector that detects a defect in the ring of pixels that surround a central pixel, a singlet corrector that detects and corrects the central pixel and removes a couplet if the ring corrector is activated, whereas if the ring corrector is switched off, the singlet corrector only removes singlets, and a peak-and-valley detector that avoids overcorrection by avoiding correcting signal peaks or valleys in case of spikes or drops in signal.

26 Claims, 12 Drawing Sheets

(51) Int. Cl.
*H04N 5/367* (2011.01)
*H04N 9/04* (2006.01)

(56) References Cited

U.S. PATENT DOCUMENTS

| | | |
|---|---|---|
| 2006/0152530 A1 | 7/2006 | Smith |
| 2006/0233456 A1 | 10/2006 | Ahn et al. |
| 2007/0211307 A1 | 9/2007 | Uvarov |
| 2008/0075354 A1 | 3/2008 | Kalevo |
| 2009/0274368 A1 | 11/2009 | Watanabe |
| 2010/0119163 A1 | 5/2010 | Inoue |
| 2011/0234842 A1 | 9/2011 | Ishiga |
| 2012/0133804 A1* | 5/2012 | Kim .............................. 348/246 |

OTHER PUBLICATIONS

Bosco et al., "Temporal Noise Reduction of Bayer Matrixed Video Data," ICME '02, IEEE International Conference on Multimedia and Expo, 2002, pp. 681-684.

Foi et al., "Noise Measurement for Raw-Data of Digital Imaging Sensors by Automatic Segmentation of Nonuniform Targets," *IEEE Sensors Journal* 7(10):1456-1461, Oct. 2007.

Foi et al., "Practical Poissonian-Gaussian Noise Modeling and Fitting for Single-Image Raw-Data," *IEEE Transactions on Image Processing* 17(10):1737-1754, Oct. 2008.

* cited by examiner

Fig. 8
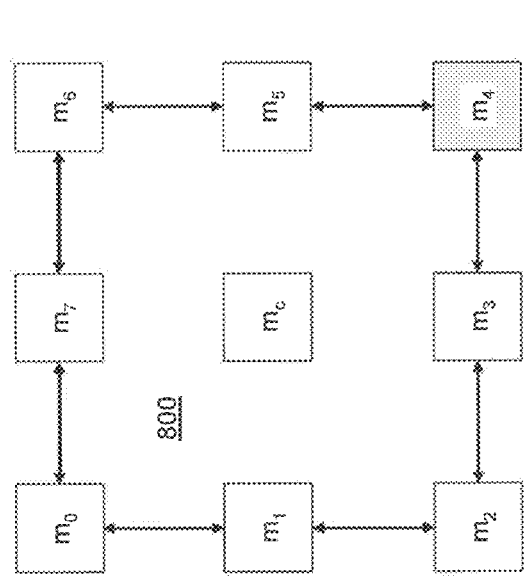
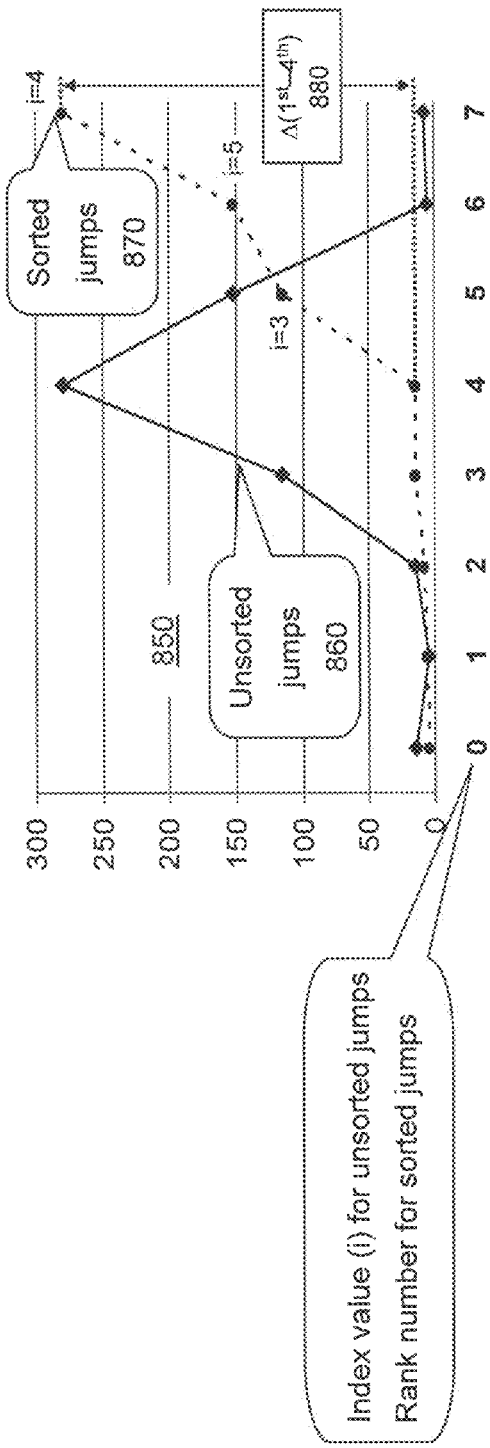

Fig. 12 ial Patent
COLOR FILTER ARRAY DEFECT CORRECTION

PRIORITY CLAIM

The instant application claims priority to Italian Patent Application No. VI2011A000336, filed Dec. 23, 2011, which application is incorporated herein by reference in its entirety.

TECHNICAL FIELD

An embodiment relates to the processing of digital images and, more particularly, to methods and systems for filtering and correcting digital-image defects in the color-filter-array domain.

BACKGROUND

Digital images are being used in numerous applications, for example, with acquisition devices like still and/or video cameras. Moreover, digital-image sensors are also used with mobile-phone devices and/or so-called smart phones in a widespread manner.

It is well known that any of these digital-image acquisition devices will, due to the characteristics of digital-image sensors used, intrinsically introduce digital-image defects into the acquired digital images. These image defects are easily detectable by the human visual system as they are out of context and can be of very bright or very dark appearance. However, they may also be masked by a texture of the digital image such that the defect may not be visible.

In other words, image sensors are well known to be imperfect devices. Thus, faulty elements of an image sensor can show up in the light-sensitive array. Image defects caused by these faulty elements can appear as isolated, faulty pixels (so-called "singlets") or adjacent faulty pixels (so-called "couplets"). Although these image defects may be easily detectable by the human eye, their filtering and cancellation is a complex task to be executed by the image-acquisition device. In that regard, defect cancellation is of primary importance.

In addition, not all image defects are "static", i.e., of a stable appearance, independent from other factors. In contrast, some of the digital-image effects are always visible, whereas others may show up only in low-light conditions, depending, for example, on the image-acquisition settings such as integration time, analog gain, digital gain, etc.

Various filtering techniques have been developed in order to reduce and/or eliminate such image defects. However, many of these techniques are associated with numerous drawbacks and problems that are bound up with, for example, inadequate performance, processing complexity, and processing costs that make it difficult to employ these techniques in portable image-acquisition devices. Moreover, these solutions generally change their defect-correction characteristics depending on various external factors, for example, acquisition settings in terms of integration time, analog gain, digital gain, and the like. However, in order to achieve satisfying defect-correction performance for different variations of these factors, cumbersome tuning and calibration efforts have to be performed.

SUMMARY

Thus, there is a need for improved methods and systems for image-defect correction.

An embodiment is a method for detecting defects in a digital image in CFA format. This method processes a digital image to obtain a corresponding CFA raw image and obtains a selection mask from that CFA raw image including pixels of a same CFA channel. In that selection mask, a central pixel of the selection mask is identified and the method detects whether the identified central pixel is located in a flat or non-flat area of the digital image.

In response to the step of detecting, the method determines whether the central pixel is defective. The determining depends on whether or not the central pixel is located in a flat area and is further based on a pre-determined noise curve.

Finally, if the central pixel is determined as defective, the method corrects the central pixel with a flat-type correction if it is detected to be in a flat area, or with a non-flat-type correction if it is detected to be in a non-flat area.

Thus, an embodiment relies on the insight that defects in digital images do not always appear in the same locations. Some defects may appear only at certain levels of signal amplification (i.e., mid-high ISO settings) and/or they may appear starting from a certain integration time (e.g., they may appear when the integration time exceeds, say, 10 ms).

The defective pixels that have such abnormal behavior are also known as leaky pixels. They do not respond well to light, and may generate output signals that do not correspond to the effective light that strikes them or may have bad signal amplification. They are more likely to show up in low-light conditions. The degree of defectiveness of some pixels may not be high enough such that they are marked as defects. In other words, they have a character of being in a sort of ambiguous zone between generating a useful signal and causing a small defect.

These defects usually survive defect-correction algorithms, and are then eventually averaged by a Gaussian filter performed after defect correction to remove Gaussian noise. The end result is that these quasi-defects are still visible, e.g., as slightly darker or brighter pixels in the final image, causing an annoying residual quasi-Gaussian random noise.

Further, image defects may be masked by the image itself. This is the case, for example, when the defect is of the same color and intensity as the area in which it is located, e.g., a spike in a bright area. Defects may also be concealed by texture. However, the degree of concealment depends on the image content. Thus, flat areas usually do not conceal defects unless they are of the same color and intensity of the flat area.

Therefore, in an embodiment, a method before the detecting step further identifies in the selection mask a first ring of pixels with a first central pixel and determines if any of the pixels in the first ring of pixels is a suspect defect.

In response to determining one of the pixels in the ring of pixels as a suspect defect, identifying in the selection mask a second ring of pixels with the determined suspect defect as second central pixel is identified and it is determined if the pixels in the second ring of pixels include a defect pixel, forming a couplet defect with the suspect defect.

Finally, in response to determining the couplet defect, the suspect defect is confirmed as a real defect and is temporarily corrected.

In a further embodiment, a method before correcting the identified central pixel further performs a peak-and-valley detection based on taking into account pixels of all CFA channels, wherein the pixels of other than the same CFA channel correspond to the obtained selection mask.

In a further embodiment, each CFA raw image is made up of a respective pixel matrix, the pixels of said matrix being associated on the basis of their respective positions within one of a set of chromatic components, and wherein said obtained selection mask includes pixels associated with the same chromatic component.

In a further embodiment, the CFA raw image is in Bayer CFA format and said chromatic components form part of the set including the color red, the color green and the color blue.

Finally, in a further embodiment, the selection matrices differ according to the chromatic component such that all pixels of the selection mask have the same chromatic component, discarding the others. For example, the selection masks for all chromatic components have the same, e.g., square, shape. In another embodiment, alternatively for some of the chromatic components, an alternative, e.g., diamond shape maybe used. In an embodiment, for the case of a CFA raw image, a diamond-shaped selection mask may be used for the chromatic component with the color green whereas square-shaped selection masks may be used for the chromatic components with color red and color blue.

Further, another embodiment is a filter for detecting and correcting defects in CFA images, characterized in that said detecting and correcting may be performed by the steps of any of the above-described embodiments. In addition, another embodiment is a digital-image acquisition device for acquiring one or more digital images in CFA format, including a sensor for acquiring said images, said sensor including a CFA filter, characterized in that the one or more images in CFA format are processed according to the steps of any of the above-described embodiments.

Finally, an embodiment is a computer-readable medium having stored thereon computer-readable instructions that when run on a computer are configured for performing the steps of any of the above-described embodiments.

BRIEF DESCRIPTION OF THE DRAWINGS

These and further embodiments are described in the following with reference to the accompanying drawings in which:

FIG. 8 schematically shows an exemplary digital-image kernel and the detection of a ring defect in that kernel based on computed and sorted ring values in accordance with an embodiment.

FIG. 12 exemplarily shows a 9×9 digital-image kernel being subject to a peak-and-valley detection in accordance with an embodiment.

DETAILED DESCRIPTION

Embodiments as outlined in the following relate to portable devices capable of acquiring digital images and/or digital-image sequences. More particularly, embodiments relate to the correction of defects in acquired digital images.

Figure 1:
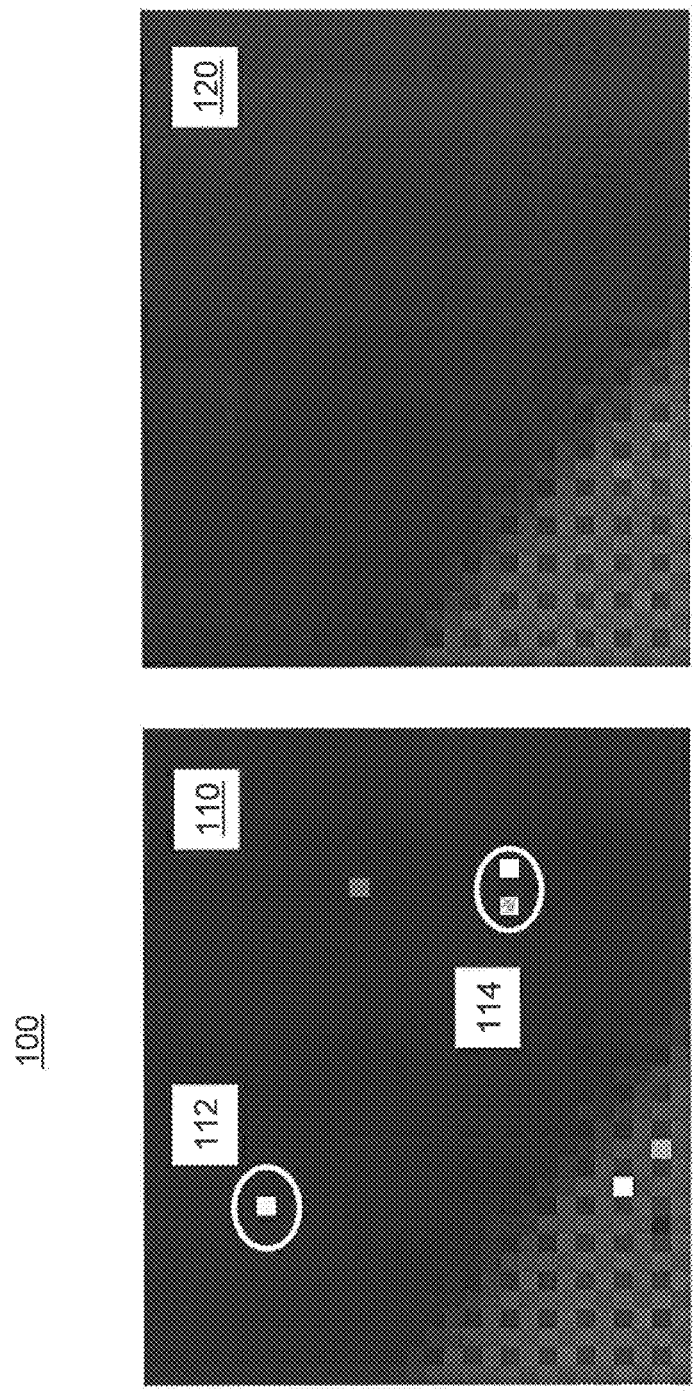
FIG. 1 shows exemplary image defects with singlet and couplet characteristics on an optical color-filtered array filter (CFA filter), FIG. 2 schematically shows the building blocks of an image-correction system in accordance with an embodiment.

FIG. 1 exemplarily shows an acquired digital image in the domain of the color-filter array (CFA). More particularly, FIG. 1 shows the colored-filter array 110 for an acquired digital image 100 before detecting and correcting errors 114/112, and the color-filter array 120 after image-defect detection and correction.

It is well known that the optical sensor of a digital-image-acquisition device, for example a digital-photo or -video camera, may be built as a CCD (charge-coupled device) sensor or a CMOS (complementary metal-oxide-semiconductor) sensor. These are integrated circuits including a matrix of photosensitive cells, each of which serves to generate an electrical signal proportional to the quantity of light that strikes it during the acquisition interval.

Each photosensitive cell of the sensor, which is commonly referred to by the term "pixel", corresponds to the respective pixel of the digital image. In addition, in an embodiment, the optical sensor of a respective digital-image-acquisition device includes an optical color-filtered-array filter (CFA filter). In a sensor with a CFA filter, only a single photosensitive cell is available for acquiring a pixel. The sensor is covered by an optical filter constituted by a matrix of filtering elements, each of which is associated with a photosensitive cell of the sensor. Each filtering element transmits to the photosensitive cell associated with it the light radiation corresponding to the wavelength of only red light, only green light, or only blue light, so that each pixel detects only one color component of which it absorbs more than a minimal part.

For these filters, various patterns of filtering elements are known and common. In an embodiment, the CFA filter contains a Bayer type matrix with red, green, and blue elements, and a pattern size of two times two. However, the technique presented with this embodiment may also be applied to configurations including other and particular alternative CFA filters.

FIG. 1 schematically shows a Bayer filter image that shows various defects easily detectable by the human eye, for example defect 114 and defect 112. An embodiment thus aims at correcting such defects in a digital image by removing defective pixels from a CFA raw image.

Strongly defective pixels can be classified in two main classes, spikes and dead pixels. Defective pixels surrounded by non-faulty pixels are called singlets, and pairs of adjacent defective pixels belonging to the same CFA channel are called couplets. Regarding such image defects, in the following the following definitions apply unless otherwise noted:

Singlet: a single isolated faulty pixel belonging to one CFA filter channel.

Couplet: two adjacent faulty pixels belonging to the same CFA filter channel, i.e., two adjacent singlets.

Leaky pixels: a leaky pixel does not respond well to light. In critical conditions such as high temperature and/or high analog gain, the pixel has an abnormal response to light, whereas in normal conditions it behaves correctly.

Defect: refers to a pixel that is visibly different from its neighbor. A defect may be strong (spikes or dead pixels) or moderately visible but still annoying.

Ring: a set of nearest neighborhood pixels of a central pixel belonging to the same CFA channel of the central pixel forming a peripheral ring to the central pixel.

Central pixel: a single pixel being surrounded by a set of nearest neighborhood pixels, the central pixel and the peripheral neighborhood ring pixels belonging to the same CFA channel of the central pixel.

Processing kernel: a set of a ring (of pixels) and a central pixel belonging to the same CFA channel of the central pixel.

Referring to FIG. 1, embodiments thus relate to methods and systems for identifying couplet errors 114 and singlet errors 112 in a digital image at the CFA domain in order to generate a corrected or filtered digital image 120 already at the CFA domain.

As indicated by FIG. 1, image defects 114/112 are very easily detectable by the human visual system in that they are out of context and, compared to the surrounding non-defective pixels, can be very bright or dark. But a case in which such a defect may not be visible by the human eye is when it is masked by a texture being present in the digital image.

As indicated in FIG. 1, embodiments aim at removing defects 114/112 in the CFA domain before color interpolation takes place. Thus, an embodiment provides an advantage of avoiding the spreading of defects into adjacent pixel locations as the low-pass algorithms commonly used for noise reduction and de-mosaicing in fact spread defects into adjacent pixels, and thereby further decrease image quality.

As indicated by FIG. 1, the detection of a single faulty pixel (a singlet 112) may be regarded as a common task. Detecting pixel defects that are located near to each other (couplet defects 114) is a more complex and complicated correction task. However, because of the enormous number of pixels in an image sensor, the case of two defects being adjacent to each other is more likely than unlikely. Thus, embodiments rely on the insight that the correction of a couplet 114 is a rather likely necessity, and, at the same time, the removal of couplets 114 from a digital image is not as easy as the removal of single isolated defects like a singlet 112.

More particularly, the removal of couplets 114 is complicated because the couplet defect may be misinterpreted by a respective algorithm as a detail in the image (for example as a part of an edge or corner or the like). At the same time, the limited size of the processing window does not usually allow the easy discrimination of real image details from couplets. Moreover, in contrast to prior solutions, an embodiment pays particular attention to avoid any impact of a couplet 114 detection and correction on the resolution of the digital image. More particularly, an embodiment avoids damage to fine image structures such as, for example, the beginning and/or ending of small edges and/or lines, by suppressing, or rather detecting and correcting, couplets.

Rather than that, an embodiment provides the benefit of maintaining such fine image structures while at the same time significantly increasing the hit rate on detecting couplet errors. As outlined in the following, techniques according to one or more embodiments further enable the couplet correction to process more aggressively in low-light conditions, but less aggressively in conditions of high light. In order to achieve that, an embodiment provides a multi-step approach, illustrated in FIG. 2, that includes a two-pass solution as indicated, e.g., in FIGS. 3-5.

Figure 2:
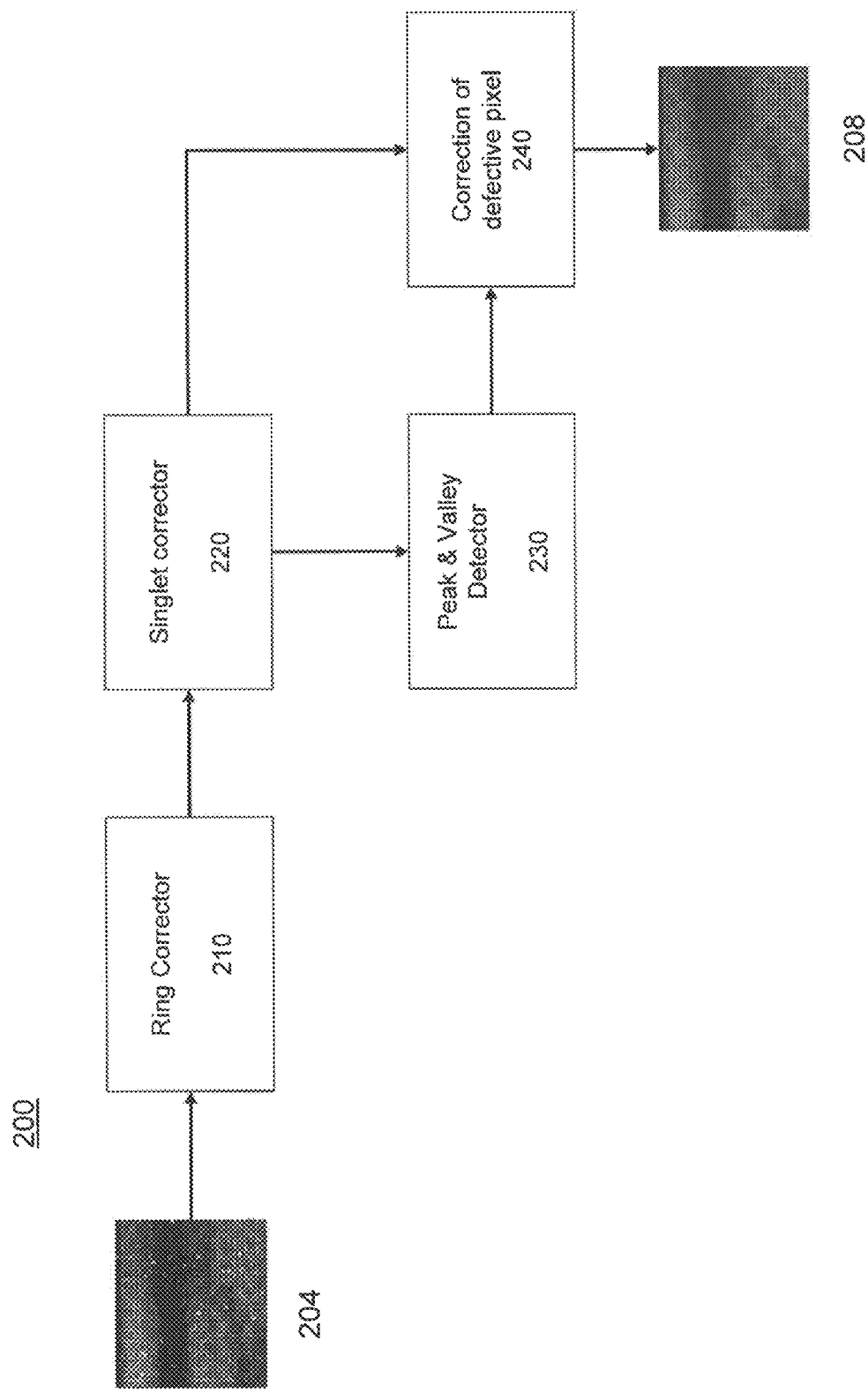

FIG. 2 schematically shows exemplary building blocks of an embodiment of an image-correction system 200 that removes both couplets 114 and singlets 112 without negatively impacting the digital-image quality. In particular, FIG. 2 shows system 200 including a ring corrector 210, a further singlet corrector 220, an additional peak and valley detector 230, and finally algorithms for the correction of identified defective pixels 240. As indicated in FIG. 2, in an embodiment, correction 240 may be applied as an outcome of the singlet corrector 220. In an alternative embodiment, before correction 240 is applied, peak-and-valley detection may be processed. Thus, the blocks 210-240 illustrated in FIG. 2 as constituting a procedural sequence may, in alternative embodiments, be processed in a different, or rather alternative, order. Moreover, each building block may or may not be applied in various embodiments. In particular, the ring corrector 210 may be switched on or off and/or the peak-and-valley detection 230 may be performed or not performed in particular embodiments. Any of these embodiments, however, will have uncorrected digital image 204 on the CFA domain as an input and provide a corrected digital image 208 in the CFA domain as an output that is used as an input again for further digital-image processing (Gaussian filtering, de-mosaicing, etc.) in the respective digital-image-acquiring device.

In a block 210, a ring corrector is provided that detects a defect 114 in the pixels of a ring that surrounds a central pixel. The aim of the ring corrector 210 is to find the peripheral pixel of a couplet 114 and correct it. However, the correction is only temporary and is not written to the output buffer in the digital-image-acquisition device.

In a block 220, a singlet corrector detects and corrects the central pixel that is surrounded by the ring that has been corrected by ring corrector 210. Thus, in case the ring corrector 210 is activated, singlet corrector 220 removes a couplet. In contrast, in case the ring corrector 210 is switched off, the singlet corrector 220 only removes singlets 112. In other words, in an embodiment after the peripheral correction performed by ring corrector 210, the singlet corrector 220 completes the correction of a couplet 114 by correcting the central pixel. However, if the CFA raw image 204 does not show any couplet 114, but rather shows just a singlet 112, then the ring corrector 210 will not correct any pixels, but the singlet corrector 220 will.

In a block 230, a peak-and-valley detector 230 prevents overcorrection. More particularly, the peak-and-valley detector 230 avoids correcting signal peaks or valleys in case of real spikes or real drops in a digital-image signal.

The image-correction system 200 thus corrects both singlets 112 and couplets 114 from a CFA raw image 204 without damaging the quality of the image. In that regard, the term "singlet" refers to a single isolated defective pixel 112 surrounded by non-faulty pixels belonging to the same CFA channel. In contrast, the term "couplet" refers to two adjacent defective pixels 114 belonging to the same CFA channel.

As indicated above, the term "ring" refers to the set of nearest neighborhood pixels of a central pixel belonging to the same CFA channel. Thus, in embodiments, the ring corrector 210 analyzes a ring of nearest neighborhood pixels of a central pixel of a processing kernel belonging to the same CFA channel of the central pixel in order to identify and correct peripheral pixel defects, i.e., defects in the pixels surrounding the central pixel.

Moreover, the defect-detection-and-correction system 200 based on the two-pass embodiment and multi-step approach of ring corrector 210 presents a filter that serves both as a strong defect corrector as well as a pre-processing signal leveller for the Gaussian filter that is usually applied on the raw image after defect correction in the CFA domain. As is well known, these Gaussian filterings are performed after defect correction 200 in the CFA domain in order to remove Gaussian noise. Based on strong defect correction and preprocessing signal levelling of system 200, an embodiment avoids residual quasi-Gaussian random noise caused by defects that may survive prior-art correction algorithms.

As will be further outlined in detail in the following, the ring corrector 210 corrects a defective peripheral pixel 112 in the neighborhood of a central pixel in the same CFA channel. This correction, as indicated above is, however, only of a temporary nature and only a preliminary—or rather a preparatory—activity prior to the processing of singlet corrector 220. Thus, the output of ring corrector 210, i.e., original- and temporarily corrected pixels, is not written into an output buffer of the respective digital-image-acquisition device, but instead form the input to singlet corrector 220 and (only) the output of singlet corrector 220 (with or without further applying peak-and-valley detection 230) is written to that output buffer as a permanent correction.

For performing that temporary correction in ring corrector 210, various algorithms and methods may apply in different embodiments. In an embodiment, the defective ring pixel 114 may be corrected using the median of the pixels adjacent to the defective ring pixel 114. In other embodiments, the average of the pixels adjacent to the defective ring pixel 114 may be used. The correction applied by the ring corrector 210 is, however, only of temporary character as the role of the ring corrector 210 in defect-correction system 200 is to localize and correct peripheral pixels of a couplet defect 114 rather than detecting and correcting a singlet 112 as singlet detection and correction is performed in system 200 by singlet corrector 220 on a more sophisticated basis with or without an additional peak-and-valley detection 230 processing.

Figure 3:
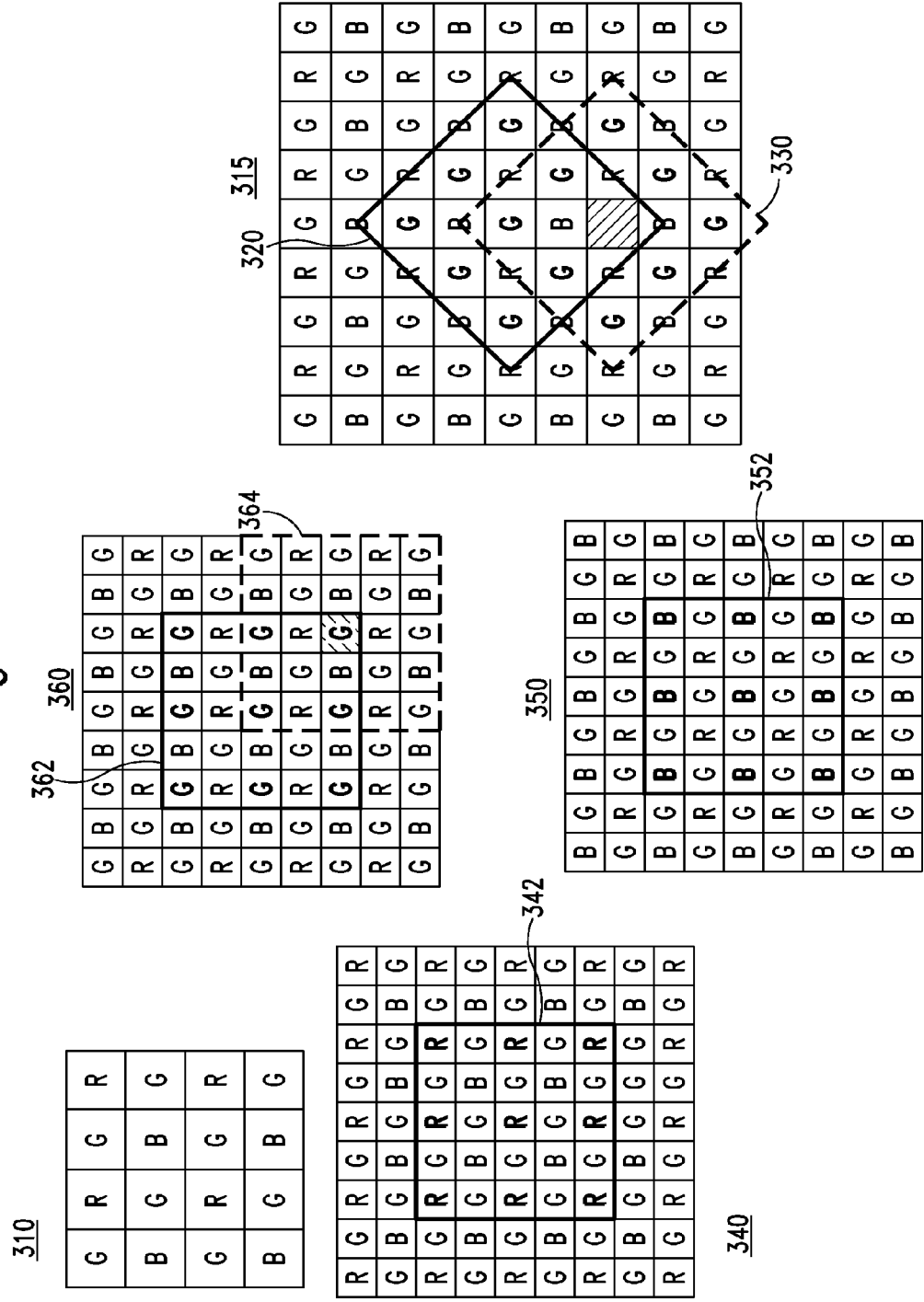
FIG. 3 schematically shows exemplary color-filter-array kernels in accordance with an embodiment.

FIG. 3 shows a CFA filter 310 that, in an embodiment, covers the image sensor of a digital-image-acquisition device as an optical filter that is constituted by a matrix of filtering elements. In an embodiment, this CFA filter 310 may be formed by a pattern of filtering elements that constitutes a Bayer filter. As indicated in FIG. 3, the pattern of this Bayer-type filter has a 2×2-size built by single chromatic components, in particular red, green, and blue elements indicated in FIG. 3 by the letters R (red), G (green), and B (blue). Thus, in the CFA domain, the digital image has a CFA raw format where each pixel is constituted by just a single chromatic component (R, G, or B). For this, each of these pixels has an associated single digital value that corresponds to the quantity of light that strikes the respective photosensitive cell of the sensor. Thus, image correction system 200 operates directly on digital CFA image 310 to produce a filtered, or rather corrected, CFA image 208 with reduced defects 114/112 on its output side for any CFA image 204 containing defects 114/112 on its input side. In some embodiments, the CFA filter may be of a Bayer type; however in further embodiments alternative filters may also be used.

In an embodiment, the double-pass correction performed by ring corrector 210 is performed on a selection mask 360/350/340, which is formed by selecting adjacent pixels that have associated with them the same color, i.e., red, green, or blue, as a central pixel to be tested and potentially corrected. In an embodiment, the selection is performed by using selection masks or matrices that differ on the basis of the color of the pixel to be filtered. In an embodiment, the dimensions of these selection masks 360/350/340 are each 9×9 pixels, respectively, and the shape of the selection masks 360/350/340 is square. However, in an alternative embodiment, at least for the chromatic component green (G), alternatively a diamond-shaped 9×9 kernel 315 may be used. Thus, in embodiments, diamond-shaped and square-shaped kernels of the size of 9×9 may be used alternatively. The dimensions of the selection masks 360 (or in an alternative embodiment selection mask 315)/340/350 constitute a processing kernel size of 9×9 that enables a two-pass solution to be implemented with the ring corrector 210 (alternatively, kernel sizes other than 9×9 are contemplated).

With the kernel size of 9×9 as indicated with selection mask 360, in an embodiment, a two-pass solution is implemented that for any of the three channels R, G, or B allows a first pass ring 362 to be defined, formed by eight green pixels surrounding a central green pixel. In addition, based on at least one of the first-pass-ring pixels being identified as potentially defective, the 9×9 size of the selection mask 360 further allows the transformation of any of the potentially defective peripheral ring pixels of the first pass ring 362 into the central pixel of a second pass ring 364. Based on the 2×2 pattern size of the CFA filter at 310, selection masks 360, 340, and 350 vary on the basis of whether the initial central pixel is a green pixel (then selection mask 360 or, in an alternative embodiment, diamond-shaped selection mask 315 applies), is a red pixel (then selection mask 340 applies), or is a blue pixel (then selection mask 350 applies).

The two-pass solution thus implemented with ring corrector 210 in image-correction system 200 with a processing kernel size of 9×9 pixels allows the avoidance of any damage induced by correction algorithms to the beginning and/or ending of sharp image details like, for example, lines or corners. Digital images 204 in that sense may, for example, have a very fine black line in a white background, e.g., a defined black line having a width of just one pixel. In a case where this very fine black line is located in an overall flat area of a digital image 204 and following prior-art methods, the beginning and the end of this line are very likely to be falsely detected as a couplet error 114. Only far from these edges of the beginning and ending of the line would a smaller processing kernel as provided with prior art algorithms not correct the pixels of the fine black line since the identification of triplets (instead of couplets) is now more likely and triplets usually do not get corrected (whereas couplets do). In an embodiment, the algorithm has no reference to the concept of the direction of a line; therefore, it may recognize an endpoint of a line, without labeling the endpoint as either the beginning or the end of the line.

However, based on extending the processing kernel size to 9×9 as indicated with selection mask 360, damages to fine lines and other fine/sharp digital image details can be avoided as the 9×9 kernel size allows for a first pass ring 362 and a second pass ring 364 that allow for the analysis of whether the processing kernel 360 is positioned at the extreme end of a fine line or another sharp/fine digital image detail or rather on a couplet defect 114.

Thus, an embodiment improves CFA defect correction 200, in particular in areas containing, for example, beginning and/or ending of fine lines and/or other sharp/fine digital-image detail, as falsely depicting such fine details as couplet defect 114 leads to digital-image damages like, for example, false color appearance in the color of the interpolated image. Moreover, an embodiment provides the further advantage of omitting any tuning measures for preparing the ring detector as the algorithm of the two-pass solution provided with the ring corrector 210 omits any dependency on, for example, noise standard deviation, but rather uses the absolute values of differences of the differences in the digital values of ring pixels.

Figure 4:
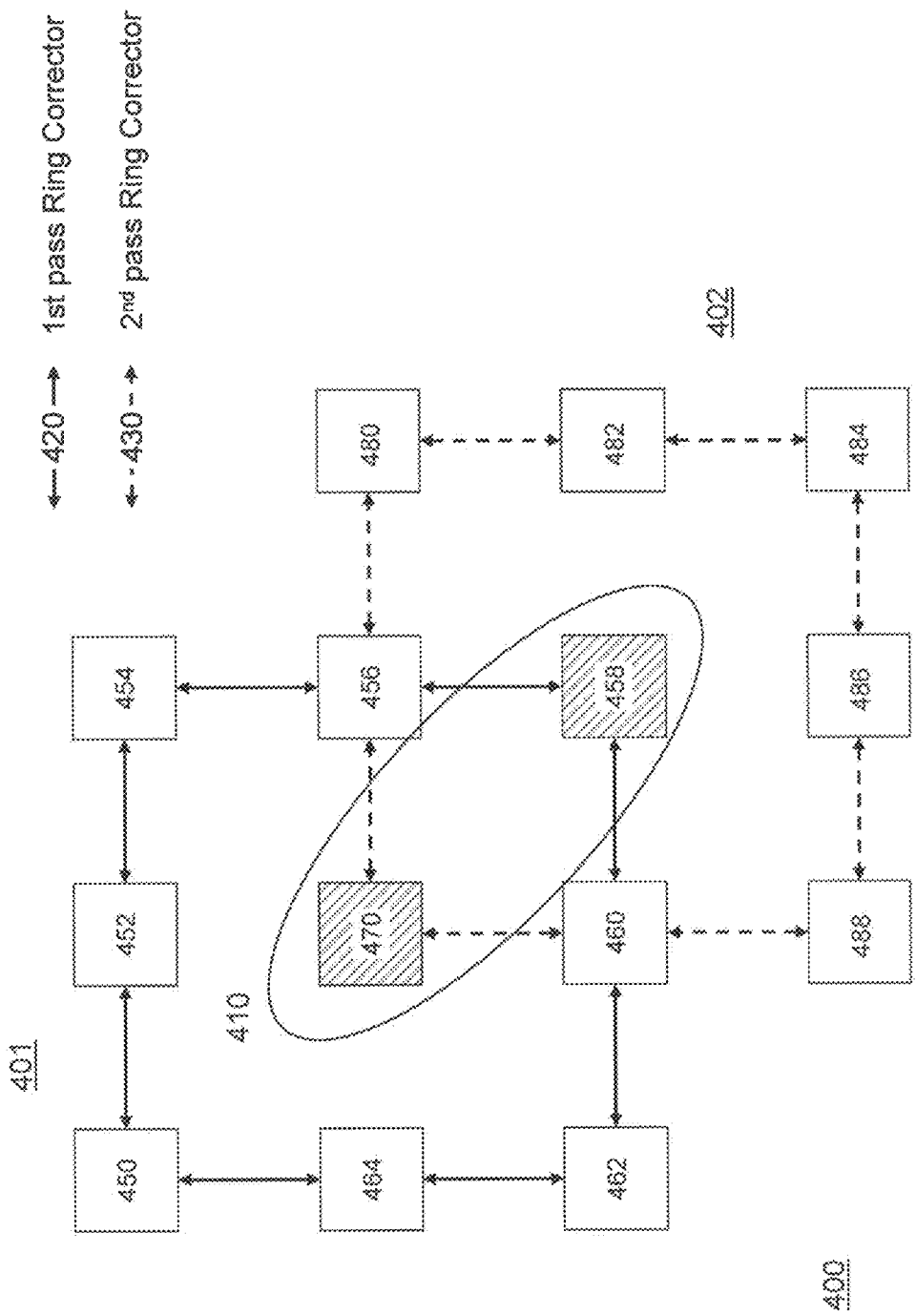
FIG. 4 schematically shows an example of a double-pass J-Ring Corrector technique for detecting a couplet in accordance with an embodiment.

FIG. 4 exemplarily illustrates an embodiment of a two-pass solution implemented by ring corrector 210. More particularly, FIG. 4 shows a pixel configuration 400 that includes a first-pass ring 401 of peripheral pixels 450 to 464, which encircle central pixel 470. Thus, configuration 400 and ring 401 are similar to the first-pass ring 362 in selection mask 360 as illustrated in FIG. 3. Configuration 400 may alternatively illustrate a first-pass ring based on starting image-correction system 200 with selection mask 340 and/or selection mask 350 as indicated with first-pass ring 342 and first-pass ring 352.

As indicated in FIG. 4, the ring 401 constituted by pixels 450 to 464 is tested in the first pass 420 of ring corrector 210 in order to identify any defective pixels amongst the ring pixels 450 to 464. As indicated in the example of FIG. 4, in configuration 400 the ring pixel 458 is found to be defective.

In response to detecting a ring pixel, in the example of FIG. 4 ring pixel 458, as defective, for the second pass 430 this potentially defective pixel 458 is made the central pixel of a second-pass ring constituted in FIG. 4 as configuration 402 with a peripheral pixel 480 to 488, pixels 460, 470, and 456. In the example of FIG. 4, in the second pass 430, pixel 470 is also detected to be defective and, based on that, the potential defect in pixel 458 is confirmed on the basis of the second pass 430 of a ring corrector 210.

The example of FIG. 4 illustrates that a couplet error 114 is represented by two adjacent defective pixels 470/458 belonging to the same CFA channel. In that respect, ring corrector 210 performs the two-pass defect detection starting with either selection masks 360, 350, 340 depending on which of the three CFA channels G (selection mask 360 or in an alternative embodiment diamond-shaped selection mask 315), R (selection mask 340), or B (selection mask 350) is to be analyzed.

As outlined further above, an embodiment corrects couplet defects 114 while avoiding damaging fine details of a digital image. In that respect, an embodiment takes into account that a couplet 114 may also be the beginning or ending of a line or a corner or another sharp/fine detail in a digital image.

To achieve this, an embodiment provides a two-pass ring corrector 210 that is based on a square 9×9 processing kernel 360/340/350 that uses two-step processing. In an alternative embodiment, at least for the CFA channel green, also a diamond shaped 9×9 processing kernel 315 may be used. In an embodiment, both steps are equal in terms of computational costs. The term "ring" in that regard refers to the set of eight pixels (in the example of FIG. 4, for example, pixels 450 to 464) that surround a central pixel 470 in a 3×3 configuration 401. As illustrated in FIG. 4, the detection of a defective ring pixel 450 to 464 is performed on the basis of two steps. In the first step following the example of FIG. 4, pixel 458 is identified as a suspect ring defect. In response to that, suspect pixel 458 becomes the central pixel in ring configuration 402 for the second pass 430 of the ring corrector 210. The suspect pixel 458 is marked as an effective defect after the confirmation from the second ring corrector pass 430.

In step 2 as illustrated in the example of FIG. 4, the ring corrector 210 examines ring configuration 402 and also identifies pixel 470 as a suspect ring defect. The identification of pixel 470 in the second pass 430 and pixel 458 in the first pass 420 as isolated close defects allows the confirmation of pixel 458 as a defective ring pixel. In the example of FIG. 4, pixel 470 and pixel 458 would form an isolated couplet defect 410.

Based on the confirmation from the second pass of the ring corrector, the defective ring pixel 458 is temporarily corrected using the values of the adjacent pixels. In an embodiment, defective pixel 458 is corrected using the median of pixels 460, 458, and 456. In other embodiments, the average may be used. However, the values of further pixels may be taken into account and/or alternative algorithms may be used.

Figure 5:
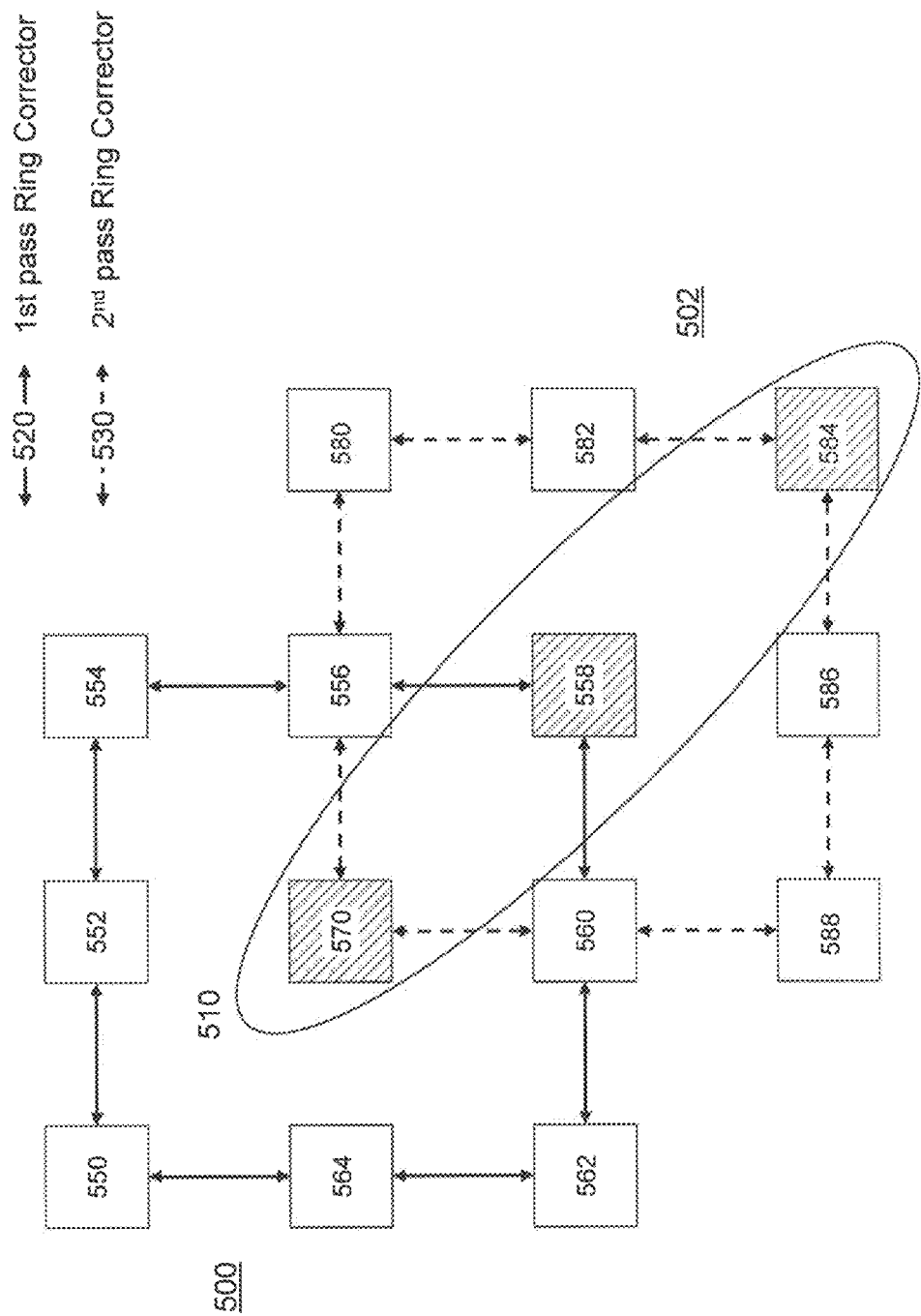
FIG. 5 schematically shows an example of a double-pass J-Ring Corrector technique for detecting the beginning of a line in accordance with an embodiment.

FIG. 5 now shows an exemplary ring configuration 500 that again is subject to the processing of the ring corrector 210. The first-pass ring configuration 500 is tested in the first pass 520. Again, similar to the example of FIG. 4, here ring pixel 558 is identified in the first pass as a suspect ring defect. Accordingly, suspect ring pixel 558 becomes the central pixel of second-pass ring configuration 502, which may confirm suspect ring defect 558 as an effective defect.

However, the example of FIG. 5 schematically shows that pixels 570, 558, and 584 may represent the ending or beginning of a diagonal line that starts in pixel 570 and further continues diagonally through pixels 558 and 584. Applying just a one-pass correction using a 3×3 processing window would possibly detect ring pixel 558 as a ring defect and also pixel 570 as a defect. This would certainly lead to a correction of a pixel 570 and 558—although as a beginning or ending of a fine line, these pixels were correct. Thus wrongly detecting and correcting pixels 558/570 as a couplet 114 is likely to cause the appearance of a false color at the beginning of the line. The same would apply to the ending of a line or similar sharp/fine digital-image details that result in similar pattern configurations.

In order to avoid these prior-art drawbacks, ring corrector 210 implements a second pass 530 that does not detect pixel 570 as a suspect defect because of pixel 584. In contrast, the algorithm implemented with the two-pass ring corrector 210 identifies pixel 570 as a beginning of a line—or rather part of a diagonal triplet—which is not to be corrected. Thus, in the example of FIG. 5 (in contrast to the example of FIG. 4), the second pass 530 does not confirm the ring defect of suspect pixel 558. Accordingly, pixel 558 is neither confirmed as a defect nor corrected.

Figure 6:
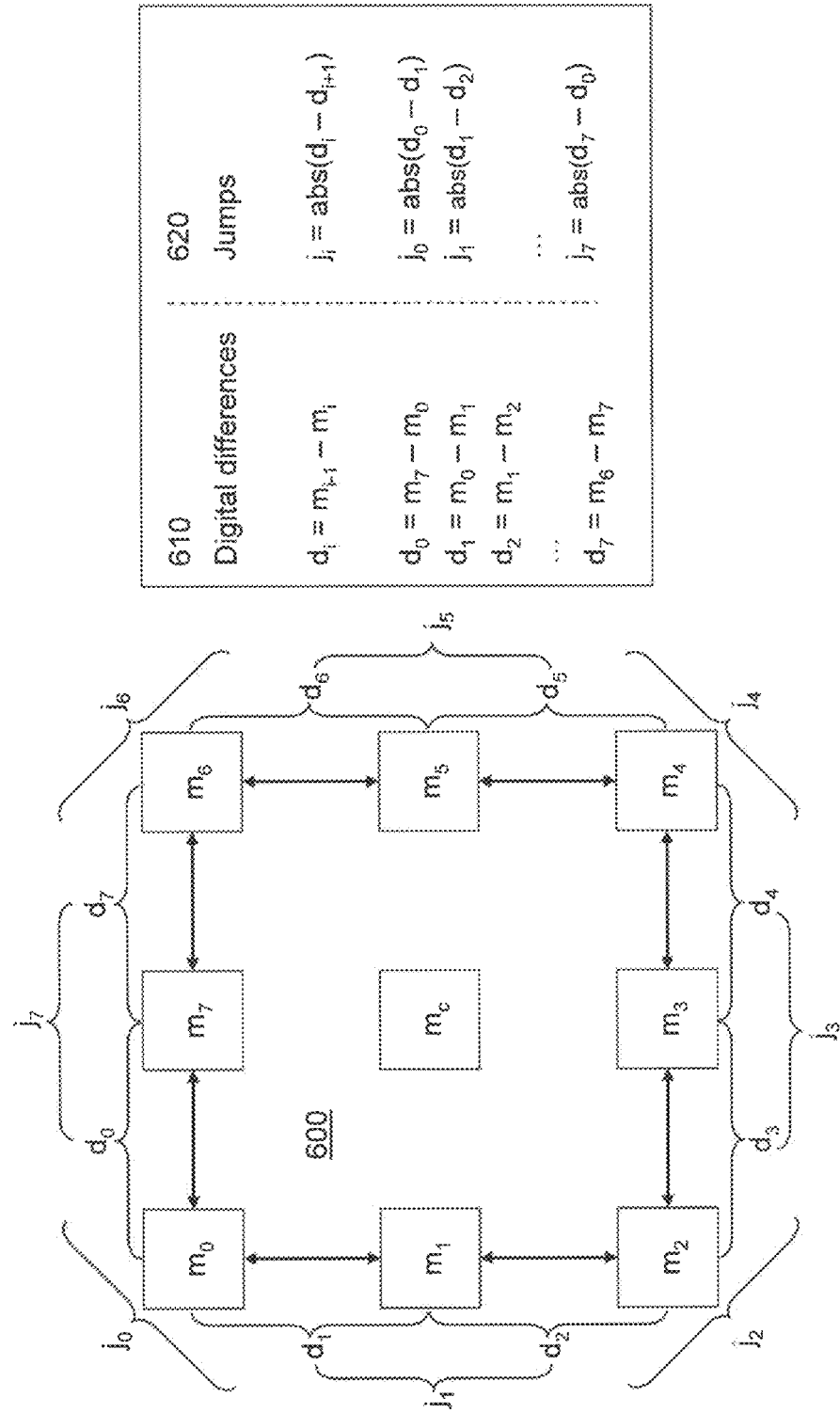
FIG. 6 schematically shows an exemplary digital-image kernel and the respective J-Ring Corrector computations in accordance with an embodiment.

FIG. 6 illustrates an exemplary computation of the suspect-ring-defect identification in an embodiment, similar to the embodiments illustrated in FIGS. 4 and 5 and discussed above.

More particularly, ring corrector 210 localizes (suspect) ring defects 558 in ring configuration 600 by analyzing jumps as the absolute value of differences of the differences in the digital values between adjacent pixels $m_0$ to $m_7$ in ring 600. In other words, as indicated in FIG. 6 and outlined above, any pixel i of a pixel configuration 600 refers to the same CFA channel and has an associated digital value $m_i$, which may be, for example, one byte long, although $m_i$ may be any other suitable value. These digital values $m_i$ are represented as digital values m in the configuration example 600 of FIG. 6. Thus, the ring pixels $m_0$ to $m_7$ of configuration 600 have the digital values $m_0$ to $m_7$.

Table 610 in FIG. 6 now shows an exemplary computation of the differences of these digital values $m_0$ to $m_7$ of the adjacent pixels according to an embodiment. Any digital difference d is calculated as $d_i = m_{i-1} - m_i$. That means that $d_0$ is the difference of $m_0$ and $m_7$. As highlighted in table 610, $d_1 = m_0 - m_1$ and so forth. It is to be noted that in this computation, the values of the digital differences $d_i$ may have positive as well as negative values.

Table 620 illustrates the computation of the jumps as differences of the digital differences. Here, a jump $j_i$ is calculated as the absolute value of the difference between two adjacent pixels. That means that $j_0$ is equal to the absolute value (abs) of the difference $d_0 - d_1$. Similarly, $j_1$ is equal the absolute value (abs) of $d_1 - d_2$, and so forth.

As indicated in FIG. 6, in an embodiment, first the differences of the digital values of adjacent ring pixels are computed as values $d_i$ that may take negative or positive values. Once the set of differences $d_i$ has been computed, the absolute differences (abs) between each pair of adjacent differences $d_i$ and $d_j$ are computed as jumps 620. Accordingly, an embodiment of ring corrector 210 is based on the analysis of jumps 620. This is based on the insight that anomalies in jumps 620 can be detected more easily as further illustrated in FIG. 7.

Figure 7:
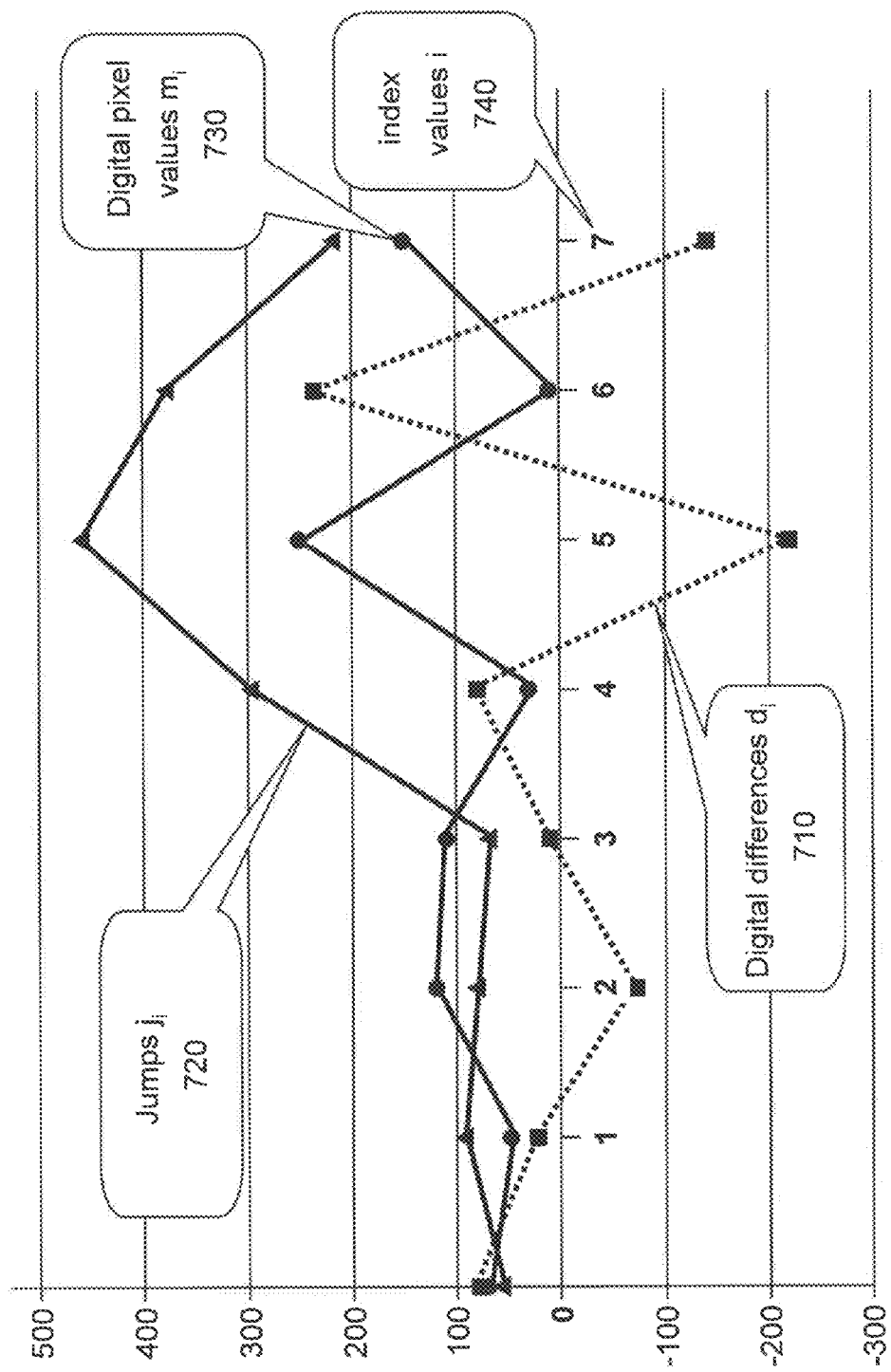
FIG. 7 shows an exemplary plot of computed J-Ring values in accordance with an embodiment.

FIG. 7 shows the results of an exemplary computation similar to the example of FIG. 6. More particularly, FIG. 7 shows the graphs of the values that have been computed based on digital pixel values $m_i$ 730, differences—or rather digital differences—between adjacent ring pixels $d_i$ 710 and the values of jumps $j_i$ as the absolute differences between each pair of adjacent differences $d_i$ and $d_j$ 720.

The x-axis serves to provide index values i 740 such that any value of jumps $j_i$ 720, digital difference $d_i$ 710, and digital pixel value $m_i$ 730 refers to the same index value i 740. As can be seen from the example and the diagram illustrated in FIG. 7, for the same ring configuration 600, the analyzing of the jump signals 720 is easier to use in order to detect ring defects 558 as the computation suggested by the algorithm of an embodiment amplifies the digital value of the middle pixel (for example, $m_3$) in the line of three adjacent pixels (for example, $m_2$, $m_3$, and $m_4$) by in effect doubling that value (i.e., $m_3$) in the computation provided by the algorithm of ring corrector 210.

The example in FIG. 7 (the example illustrating ring jumps signals 720 of a ring configuration 400 with the presence of a couplet defect 114 formed by pixel 470 and 458) highlights that jump signals 720 as compared to ring values 730 and ring differences 710 clearly indicate with the strong peak at index number i=5 the corresponding defect in the respective ring configuration 400.

FIG. 8 illustrates a similar example of a ring configuration 800 where peripheral pixels $m_0$ to $m_7$ of the ring 800 encircle a central pixel $m_c$ and maintain digital pixel values $m_0$ to $m_7$. Table 830 provides the exemplary values of $m_0$ to $m_7$ in the example of configuration 800. As can be seen from the exemplary configuration 800 and table 830, pixel $m_4$ will be a potential ring defect 114 encountered during the processing of ring corrector 210. Accordingly, table 810 shows the computed differences as differences in the digital values between adjacent ring pixels. Based on that, table 820 shows the computed jump signals as absolute differences between each pair of adjacent differences $d_i$ and $d_j$. Graphic 850 shows two graphs which represent the unsorted jump values 860 indexed by their original index number as illustrated in table 820. Accordingly, in graph 860, the value $j_3$ refers to the absolute difference of $d_3$ and $d_4$.

In addition, graphic 850 shows the graph of the sorted jumps 870 where the index on the x-axis refers to the rank number of the sorted jump values 820, wherein the rank refers to the rank of the jump value, i.e., index i=0 referring to the smallest jump value (in the example of FIG. 8: $j_1$ with a value of "5") and i=7 referring to the highest jump value (in the example of FIG. 8: $j_4$ with a value of 280).

The example of FIG. 8 shows that in the configuration 800, the ring pixel with a digital value $m_4$ contains a ring defect 458 as the value is significantly higher than the digital values of the rest of the pixels in the ring ($m_4$ equal to a digital value of 450 in this example). Moreover, table 820 shows that in a configuration 800 as well as in general, the existence of a ring defect affects three (mostly consecutive) jump values in the ring configuration 800. Furthermore, the value of $j_4$ illustrates that in an embodiment the computation of the ring corrector 210 algorithm amplifies the defective signal 558 such that the jump value (in this example $j_4$) is significantly higher than the jump values of the other pixels.

Graphic 850 thus shows that a strong peak is located at index number 4 (i.e., $m_4$). Moreover, not only is $j_4$ thus ranked highest, but also the two adjacent jumps ($j_3$ and $j_5$) are affected. Thus, the jump value $j_4$ at the peak location $m_4$ is the maximum jump in a center position where two further maximum jumps are adjacent. Moreover, graphic 850 illustrates that the fourth maximum jump located at index i=0 ($j_0$=15) is already much lower than any of the three maximum jumps associated with the pixel defect at $m_4$.

Thus, ring corrector 210 implements a set of rules in order to identify suspect ring defects 458. More particularly, ring corrector 210 detects a suspect defect 458 if one of the two following rules is satisfied:

Rule 1 (Pure Consecutiveness)
  The three highest-ranked jump values relate to consecutive pixels and the highest-ranked jump is the center position between the second and third highest-ranked jumps.
Rule 2 (Induced Consecutiveness)
  The highest- and the second highest-ranked jump values are consecutive (but the third highest-ranked jump value is not—Rule 1 thus not being fulfilled) and the difference between the third and fourth highest-ranked maximum jump values is very small, in particular below a predefined threshold value, $\Delta_{34}$.

In an embodiment, the predefined value of the threshold $\Delta_{34}$ is by default the value "3". However, it may be changed due to circumstances and/or particular applications of various embodiments. For example, in case of images with bit depth 10, a predefined threshold value $\Delta_{34}$ of "3" may apply. However, in cases of the bit depth being above, i.e., greater than, 10, $\Delta_{34}$ may be scaled according to the following rule:

$$\Delta_{34}=3*2^{(bitdepth-10)}$$

For example, for the case of the image bit depth being 12, then $\Delta_{34}$ equals to (3*2^2=)12. In this embodiment, this scaling allows coping with the wider range of values caused by the higher bit depth. In particular, by increasing the threshold value of $\Delta_{34}$, the rate of correction is increased.

Thus, if any of the above Rules 1 or 2 is satisfied, then a suspect defect 458 is localized in the ring 800 at the position indexed by the highest-ranked jump value.

The above-outlined Rule 2, however, only applies in a few specific cases in which Rule 1 (pure consecutiveness) among the first three maximum jumps is not satisfied even if there is indeed a defective pixel 458 in the ring configuration 800. For example, these special cases apply for configurations of rings 800 where the pixels $m_0$ to $m_7$ only have small digital values m. For these cases, the rules for detecting a signal anomaly or a signal peak are relaxed as indicated by the naming of the rules from a "pure consecutiveness" to "induced consecutiveness".

In particular, these relaxed versions of above-indicated Rule 2 may apply in cases where the difference between the fourth- and first-ranked jumps is very small, where the highest- and the second highest-ranked jump values are consecutive and where the highest- and third highest-ranked jump values are not consecutive. For handling these cases, a predefined threshold $\Delta_{34}$ may be used to be compared with the difference d between the third and fourth highest-ranked jump values.

While a suspect ring defect 458 is detected and localized when any of Rule 1 (pure consecutiveness) and/or Rule 2 (induced consecutiveness) applies, further rules are provided that mark a suspect defect 458 as a real defect. In other words, ring corrector 210 will, after detecting a suspect defect based on above-identified Rules 1 and 2, continue with processing the following Rules 3 and 4 in order to confirm a suspect defect. Thus, ring corrector 210 will mark a suspect defect pixel identified by Rules 1 and/or 2 for correction if (in addition to Rules 1 and/or 2) any of the following Rules 3 and 4 apply:

Rule 3 (Check for Difference Between First- and Fourth-Ranked Jump Value)

A suspect defect will be finally identified as a defective pixel in the ring if the highest-ranked jump value is k-times greater than the fourth-ranked jump value. In an embodiment, the value of k is subject to configuration and depends on the desired rate of correction. In an exemplary embodiment, a suitable value of k may be k=4 when considering high-quality images that may need a lower rate of correction. In an alternative embodiment, considering low-quality images, for achieving a more aggressive correction rate, a suitable alternative value may be k=2.

This Rule 3 is highlighted in FIG. 8 as the highest-rank jump value $j_4$ ($j_4$=280) is more than five times higher than the fourth highest-ranked jump value $j_2/j_0$ ($j_2$, $j_0$=15).

Rule 4 (Check for a Huge Difference Between the Suspect Defect-Pixel Value and the Mean of the Digital Values of the Remaining Ring Pixels)

If the value of the suspect defective pixel ($m_4$) is safeRingFactor times greater than the mean value of the ring pixels excluding the suspect defect pixel 458 (meanRingCut as the mean of digital values $m_0$ to $m_3$ and $m_5$ to $m_7$), the suspect pixel is marked as a real defect. Dually, if meanRingCut is safeRingFactor times greater than the suspect defective pixel ($m_4$), then the suspect defective pixel is marked as a real defect.

The value of the predefined threshold safeRingFactor may be by default the value "10". This is a multiplicative factor used to determine how many times the value of the suspect defect pixel ($m_4$) can differ from meanRingCut. Thus, in an embodiment this predefined threshold value is not scaled depending on the image bit depth. However, in alternative embodiments, the predefined value of safeRingFactor may be changed due to applications and/or circumstances. More particularly, by increasing the predefined value of safeRingFactor the rate of correction decreases.

The latter Rule 4 only applies in a few special cases where Rule 3 may fail to detect a defect 458, but yet a defect 458 exists. In such cases, in addition or alternatively, the digital values of the ring pixels $m_0$ to $m_7$ may be analyzed instead of jump values $j_0$ to $j_7$ in order to mark a suspect defect 458 as a real defect. For processing Rule 4, the average of the ring pixels excluding the suspect defect pixel 458 as identified by Rules 1 and/or 2 is computed as meanRingCut. Based on that, the absolute value of the difference between meanRingCut and the digital value of the suspect defect 458 as identified by Rules 1 and/or 2 are compared to a predefined threshold (safeRingFactor) that, in an embodiment, is subject to a pre-configuration.

Thus, ring corrector 210 identifies a suspect pixel 458 based on Rules 1 and/or 2 and will mark and correct this pixel (as outlined above temporarily) in case the suspect defect 458 is confirmed as real defect by processing Rules 3 and 4. As outlined further above within the context of FIGS. 4 and 5, the marking and correcting will, however, only be effectively processed by ring corrector 210 if the double check of two consecutive ring passes 420/430 on the 9×9 selection mask 360 confirms the existence of a couplet defect 114.

After the processing of the ring corrector 210, defect correction system 200 continues with the processing of the singlet corrector 220. The singlet corrector 220 according to the technique presented, if used without the above-outlined ring corrector 210, corrects single isolated pixels. However, if used jointly with ring corrector 210, singlet corrector 220 will effectively remove couplet defects 114. Thus in alternative embodiments, the ring corrector 210 may in effect be present or not, switched on or switched off.

Thus, within the defect-correction system 200, the purpose of the singlet corrector 220 is twofold:

First, if ring corrector 210 is activated, singlet corrector 220 will effectively correct a couplet defect 114 in case a defective pixel 458 was detected, marked, and corrected by the ring corrector 210.

Second, if ring corrector 210 is deactivated, singlet corrector 220 will only correct singlet defects 112, i.e., potential couplet defects 114 will not be removed (unless the singlet correct 220 happens to correct individually and independently each defect that forms a couplet defect).

In an embodiment, singlet corrector 220 works in two different modes, depending on whether the selection mask 360 is located in a flat area of a digital image 204 or not. These two working modes of singlet corrector 220 allow for performing of aggressive correction (such as, for example, averaging) or a weaker correction (as for example damping), depending on whether or not central pixel 470 is located in a flat or a textured area of a digital image 204, respectively.

In any case, localizing the defect 570 implies that the faulty element 570 is at least not sufficiently concealed by the texture of the digital image 204, even if central pixel 570 is located in a textured area.

In a further embodiment, the rate of correction may be increased or decreased according to the integration time and analog gain applied at the time of acquiring the digital image 204. In this embodiment, the rate of correction is increased with increasing analog gain and/or increasing integration time in order to reduce defects and leaky pixels.

In a further embodiment, singlet corrector 220 may be used jointly with a peak-and-valley detector 230. This embodiment is used for high-quality images as in low-quality images and/or in cases where a defect map is not available, the peak-and-valley detector may be omitted.

Figure 9:
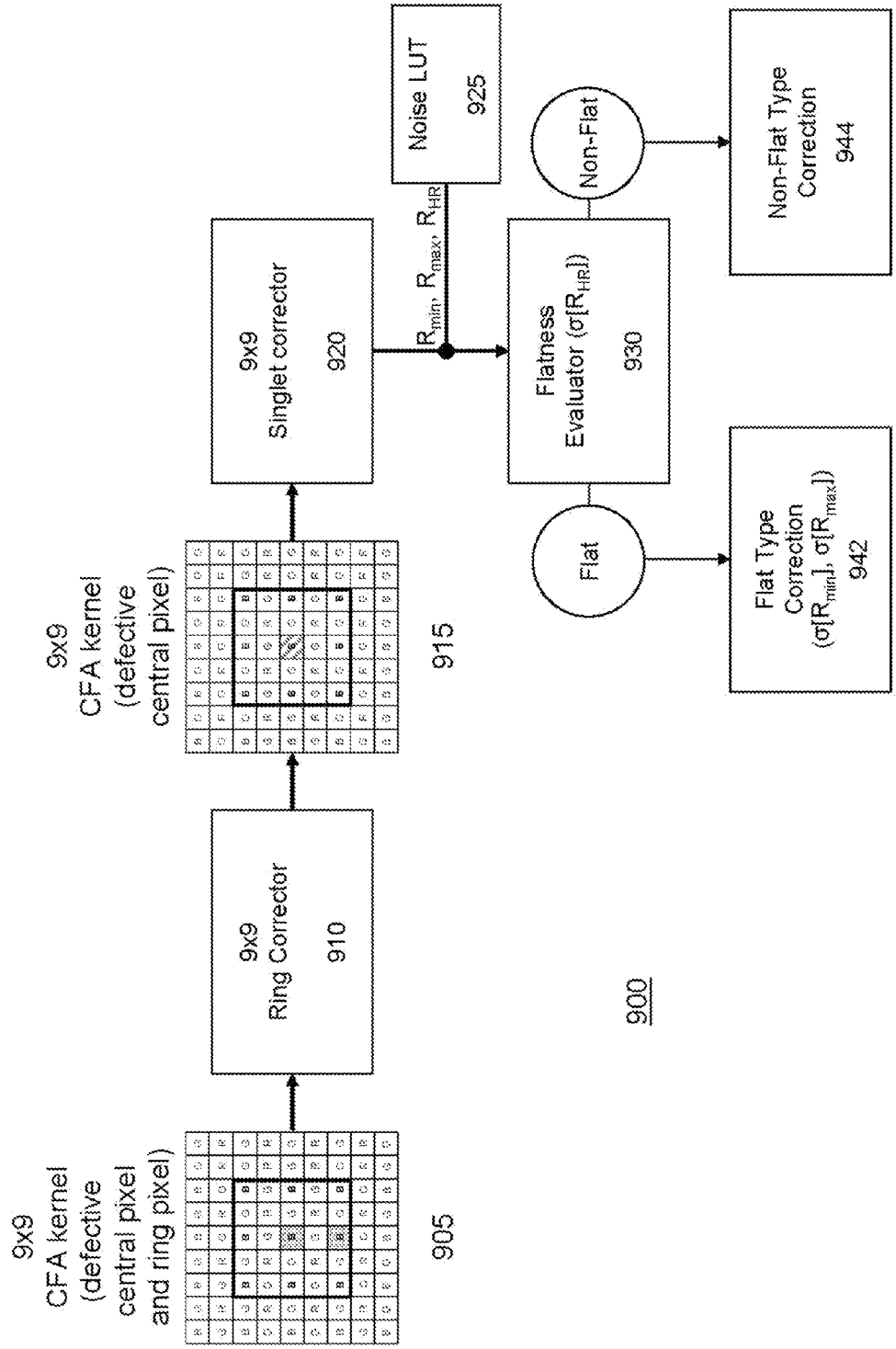
FIG. 9 schematically shows the steps of an image-defect-correction procedure in accordance with an embodiment.

As indicated in FIG. 9, singlet corrector 920 thus relies on a flatness detection 930 that is performed in an embodiment in order to evaluate the visibility of a potential defective pixel 470. Based on the outcome of the flatness evaluator 930, flat/non-flat, a flat-type correction 942 may be applied in flat and near-flat areas using e.g., a directional low-pass filter. In non-flat areas, however, a non-flat type correction 944 may be employed using a light low-pass to preserve resolution. Moreover, in an embodiment, the defect correction may adaptively become more aggressive as the image quality decreases, for example in low-light conditions indicated by increasing analog gain and/or increasing integration time.

Thus, an embodiment provides the benefit of omitting the necessity to tune the implemented algorithms to a variety of different conditions. In contrast, the defect-correction system 200 scales its correction strength automatically.

FIG. 9 thus shows a further exemplary embodiment of a defect-correction system 900. Here, a 9×9 CFA kernel 905 serves as the input of a correction system 900. As indicated in the example of FIG. 9, the initial 9×9 CFA kernel 905 contains two defective pixels 458/470 that, in the respective ring configuration of the example in FIG. 9, are located as a central pixel 470 and a ring pixel 458. Accordingly, ring detector 910 will analyze the initial kernel to identify, mark, and correct the defective ring pixel 458. However, the defective central pixel 470 is neither detected nor corrected by ring corrector 910. Thus, the output of ring corrector 910 is the 9×9 CFA kernel 915 which still has one defective pixel 470 that is the central pixel 470 of the indicated ring configuration and is further subject to the processing of the singlet corrector 920. It is to be noted that in an embodiment, correction of the defective ring pixel 458 performed by ring corrector 910 is only of a temporary character and not written into the output buffer of the respective digital-image-acquisition device. As will be outlined in the following, the more sophisticated correction methods of the singlet corrector 920 in contrast serve permanently for correcting identified defective pixels such that only the corrections applied by singlet corrector 920 are written to the output buffer of the respective digital-image-acquisition device.

Thus, in an embodiment, CFA kernel 915 with the single defective central pixel 470 will be provided to singlet corrector 920 as an input. Based on the assessment of flatness evaluator 930, a flat-type correction 942 or a non-flat type correction 944 is applied such that the central defective pixel 470 in CFA kernel 915 is permanently corrected by singlet corrector 920. In an embodiment, after this correction of singlet corrector 920, the temporary correction applied by ring corrector 910 is removed and a further 9×9 CFA including the former defective ring pixel 458 as a now defective central pixel is provided to the ring corrector 910 as an input in order to be further processed by the blocks 910 to 944 as highlighted in FIG. 9.

In the exemplary embodiment illustrated in FIG. 9, singlet corrector 920 implements at least two different behaviors depending on the flatness degree of the area in which the 9×9 kernel 915 is positioned. Thus, in this embodiment, it is first checked whether the processing kernel 915 is located in a flat area or not. After that processing of flatness evaluator 930, the 9×9 kernel 915 is analyzed to detect whether the central pixel 470 (noisyPix) of the 9×9 kernel is defective or not (in the example of FIG. 9, as indicated the central pixel 470 of kernel 915 is defective). In an embodiment, also the detecting 920 of whether or not the central pixel 470 of kernel 915 is defective depends on the flatness evaluation 930 and changes between areas that are evaluated as being flat or near-flat and areas evaluated as being textured.

For example, flatness evaluator 930 implements statistical algorithms that do not take into account the central pixel 470, i.e., noisyPix. By excluding the central pixel 470 from the flatness evaluation process, an embodiment takes into account that the central pixel 470's correctness cannot be relied on.

In an embodiment, flatness evaluator 930 computes a digital value of a "virtual" pixel, a pixel that may not exist in kernel 915 that has a digital value that equals the average of the maximum and minimum digital ring values, i.e., the middle of the statistical range in ring values $m_0$ to $m_7$ in the ring configuration of kernel 915. Based on that, flatness evaluator 930 builds a Gaussian bell centred on this computed pixel. The width of the Gaussian bell is related to the noise standard deviation associated with the calculated digital value, i.e. the pixel intensity of the "virtual" pixel in the middle of the range of the ring pixel's digital values.

Figure 10:
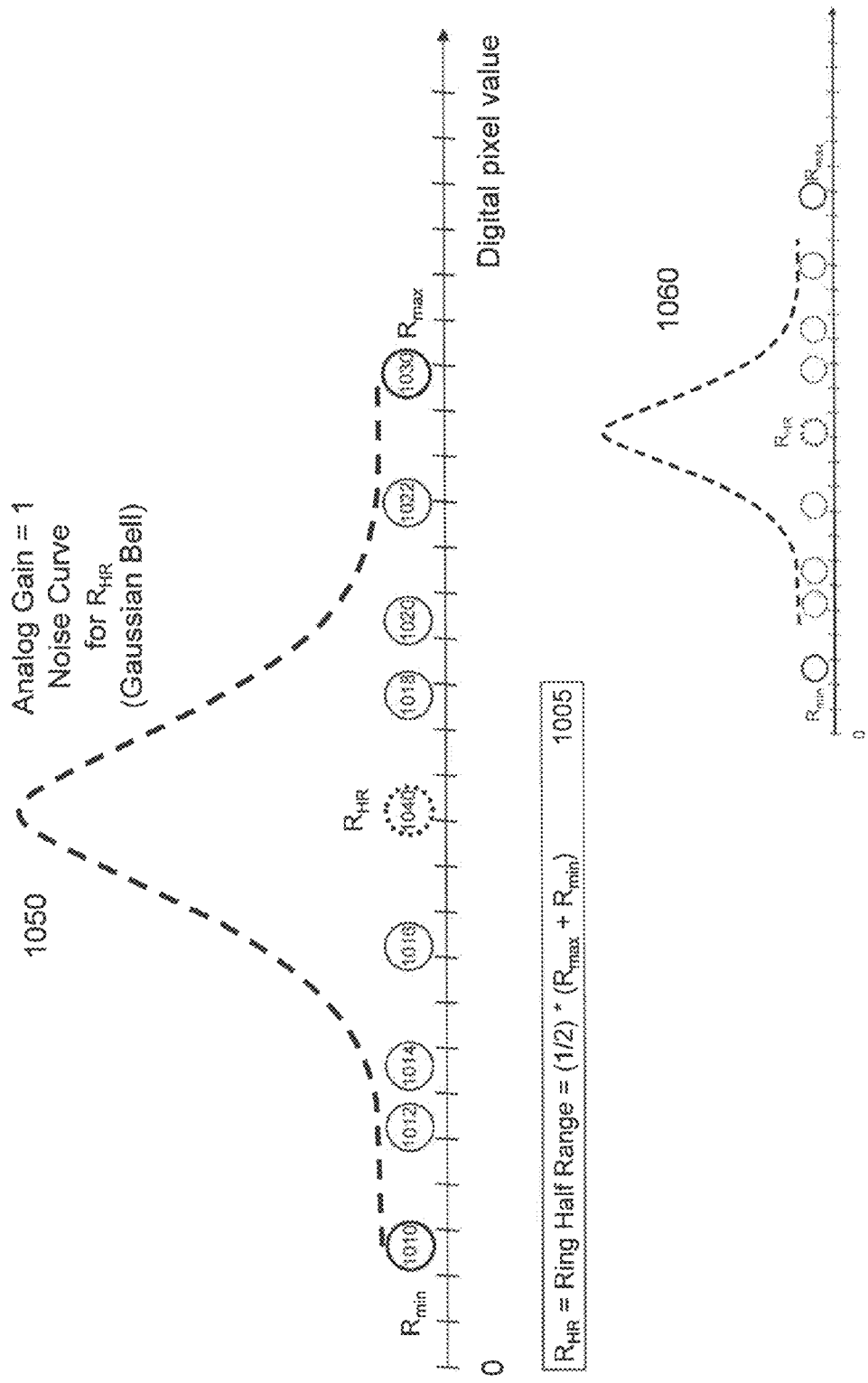
FIG. 10 schematically illustrates two examples of digital-image kernels being subject to flatness evaluation based on noise curves in accordance with an embodiment.

This is further illustrated in FIG. 10. The half-ring value $Ring_{HR}$ is computed as depicted in equation 1005 and is equal to the middle of the statistical range between the ring's minimum digital pixel value $R_{min}$ 1010 and the ring's maximum digital pixel value $R_{max}$. The eight pixel values 1010 to 1030 again form the indicated ring in kernel 915 encircling a central pixel 470 that is tested and potentially corrected by singlet corrector 920. Flatness evaluator 930 further considers a Gaussian bell 1050 centered on $Ring_{HR}$, ($Ring_{HR}$,=the mid point between $Ring_{Min}$ and $Ring_{Max}$). In general, $Ring_{HR}$ will only be a "virtual" pixel 1040 which is represented by a digital pixel value not existing among the inner ring pixels 1010 to 1030.

The noise level associated with $Ring_{HR}$ is retrieved from a noise look-up table 925 that provides a noise curve for analog gain 1 (AG1 noise curve). In an embodiment, an AG1 noise curve is relied upon independent from the analog gain applied when acquiring the digital image. The noise standard deviation a as indicated in FIG. 9 is retrieved from the noise curve obtained in a profiling phase of the image sensor of the respective digital-image-acquiring device. Again, only the noise curve relating to the case in which no amplification has been applied is considered, i.e., analog gain equal to 1 or ISO 100.

Based on that, flatness evaluator 930 evaluates the respective area as flat if bell 1050 includes all ring pixels 1010 to 1030. If that is not the case, as in the example 1060 of FIG. 10, the area is marked as non-flat. In other words, if the minimum and maximum pixels in the ring are under the Gaussian bell (the case of example 1050 in FIG. 10), then the area is estimated as flat, otherwise, if at least one pixel is out of the bell (the case of example 1060 in FIG. 10), then the area is estimated as non-flat.

In an embodiment, flatness evaluator 930 additionally takes into account another factor controlling the width of the bell. This factor, flatFactor, multiplies the noise standard deviation, ringStd, associated with $Ring_{HR}$. This flatFactor is equal to "2" for high-quality images and "4" for low-quality images. As a consequence, the bell 1050 will be narrower for good images and wider for low-quality images. By restricting the Gaussian bell 1050 for high-quality images, the probability of detecting flat areas is reduced such that the sensitivity is increased and only fewer-but-definitely flat areas are detected.

As depicted in FIG. 10 after the processing of ring corrector 910, no defects are assumed in the ring. In other words, it is implied that the pixels 1010 surrounding the central pixel 470 under inspection are good, i.e., the ring corrector 910 has corrected any potentially faulty pixel element 1010-1030 in the ring.

Based on that, in an embodiment, flatness evaluator 930 considers the following values:

$$ringMin = \text{Minimum}[1010 \text{ to } 1030]$$

$$ringMax = \text{Maximum}[1010 \text{ to } 1030]$$

$$ringHalfRange = \frac{ringMax + ringMin}{2}$$

$$flatFactor = 2 + \left(2 * \frac{analogGain}{\max AnalogGain}\right) + 0.5$$

$$flatFactor \in [2, 4]$$

$$ringStd = noiseLevel[ringHalfRange]$$

Based on the above-computed values, flatness evaluator 930 determines if the processing window 915 is located in a flat area or not. As outlined above, this evaluation may not include the central pixel 470 because the central pixel element 470, noisyPix, is the one tested for defectiveness. Flatness evaluator 930 thus determines whether processing window 915 is located in a flat area by checking whether both of the following two conditions apply:

ringMax≤ringHalfRange+(flatFactor*ringStd)

ringMin≥ringHalfRange−(flatFactor*ringStd)

These two conditions enable flatness evaluator 930 to determine whether the ring's minimum 1010 and maximum 1030 values are inside the Gaussian bell 1050. In an embodiment, the value of flatFactor is limited to the range [2 ... 4] so that in a good-quality image, i.e., acquired in good light with some minimum or near-minimum analog gain (in an illustrative example, e.g., an analog gain value of 1), the detection of flat areas is not too likely. In contrast, for the case of low-quality images, i.e., acquired in low light with some maximum or near-maximum analog gain (in an illustrative example, e.g., an analog gain value of ~16), the criterion for locating flat areas is relaxed in order to avoid that too few flat areas are detected. In an embodiment, this relaxation is achieved by increasing flatFactor up to 4. Thus, in an embodiment, for intermediate analog gains between minimum-analog-gain (e.g., a value of 1) and maximum or near-maximum-analog-gain (e.g., a value of 16), flatFactor will assume values between 2 and 4.

If both of the above two conditions are satisfied, flatness evaluator 930 has determined that a Gaussian bell centered on ringHalfRange having a standard deviation of ringStd includes under its tails both ringMax and ringMin. The areas satisfying these conditions are estimated by flatness evaluator 930 as flat.

As outlined above, determining whether the central pixel 470, noisyPix, is defective or not depends on whether the kernel area 915 has been estimated flat or not according to the above outlined algorithms.

If the area is estimated flat (as is the case in example 1050 of FIG. 10), a further Gaussian bell centered on ringHalfRange is built. This further bell, however, is not necessarily symmetrical around ringHalfRange. In an embodiment, the bell rather at its right-hand tail extends for $3*\sigma$ whereas the left-hand tail extends only $2*\sigma$. If the central pixel 470 (noisyPix) is outside of this bell, then it is considered a defect, otherwise it is considered a good pixel.

In an embodiment, if the area 915 is determined as flat, the following two thresholds, maxTh and minTh, are adopted to define the correction process in case of flatness:

$$\max Th = \text{ringHalfRange} + k_{max} * \text{ringStd}$$

$$\min Th = \text{ringHalfRange} - k_{min} * \text{ringStd}$$

For computing the thresholds, in an embodiment a value of "3" is adopted for $k_{max}$ whereas a value of "2" is adopted for $k_{min}$ which results in an asymmetrical Gaussian bell. However, in alternative embodiments, other values of $k_{min}$ and $k_{max}$ may also be applied. Other values may be used depending on the desired degree of sensitivity. For example, the above thresholds are clipped, if necessary, according to the following conditions:

if max$Th>$maxPixValue then max$Th=$maxPixValue if min$Th<0$ then min$Th=0$

The above two adaptive thresholds are used as upper and lower bounds respectively for correction. More specifically, for defect detection in an area estimated to be flat, the singlet corrector 920 determines if the digital value of the central pixel 470, noisyPix, is outside of the range determined by minTh and maxTh. If noisyPix falls outside of this interval, then it is marked as defective, otherwise it is determined to be a good pixel.

The effective correction 240 in case of a defect detected in an area that has been estimated as flat can, in an embodiment, be as strong as an average of the eight surrounding pixels. In that case, i.e., if the defect is located in a flat area, then, in an embodiment, it may be substituted with a weighted average of its neighborhood pixel values. This weighted average could be simply a box filter in which all pixels are weighted equally; or it could be an average such that a different weight is assigned to each ring pixel 1010-1030 depending on some particular criterion. In an alternative embodiment, it can be a directional weighted average. In an even further embodiment, for correction the central pixel 470 may be substituted with the ring pair-wise average closest to the central pixel 470. In that embodiment, referring to the example 800 of FIG. 8, the values of $(m_0+m_4)/2$, $(m_1+m_6)/2$, $(m_2+m_6)/2$, and $(m_3+m_7)/2$ are computed. The one of these calculated four values that is the closest to the digital value of the central pixel 470 represents the new corrected central pixel value 470.

As outlined above, flatness evaluator 930 determines whether processing window 915 is located in a flat area by checking whether both of the following two conditions apply:

ringMax≤ringHalfRange+(flatFactor*ringStd)

ringMin≥ringHalfRange−(flatFactor*ringStd)

In the case that at least one of these two conditions fails, the flatness test is failed, which determines that, e.g., the ring range is rather large. Thus, flatness evaluator 930 in this case estimates processing window 915 to be not corresponding to a flat area. As the determining of whether the central pixel 470, noisyPix, is defective or not depends on whether the kernel area 915 has been estimated to correspond to a flat or a non-flat area, the defect detection now for the case of a non-flat area being detected is adjusted.

In this case, i.e., if the area 915 is estimated as not flat, then the criterion for deciding the defectiveness of the central pixel 470 changes. Due to the fact that the area 915 is not flat, it may potentially contain texture. This texture will likely conceal a defect in pixel 470. In an embodiment, based on this assumption, the central pixel 470 is allowed to be greater than the ring maximum 1030 and lower than the ring minimum 1010. In an embodiment, the central pixel 470 may, for example, be marked as a defect only if it exceeds the digital value of ringMax 1030 by $2*\sigma(\text{ringMax})$, or if it is smaller than the digital value of ringMin by $2*\sigma(\text{ringMin})$.

More particularly, the digital value of the central pixel 470 to be tested and potentially corrected may lie for the case of a non-flat area outside of the ring range defined by ringMin and ringMax without being a defective pixel.

Thus, an embodiment provides a threshold that allows for determining how far the central pixel 470 can lie outside of the ring range [ringMin ... ringMax] without being a defect. For computing these thresholds, again noise look-up table 925 (noiseLUT) is considered for retrieving a noise curve at analog gain 1 (noiseLUT$_{AG1}$). For example, the noise curve is obtained in a profiling phase of the image sensor of the respective digital-image-acquiring device. Based on that, the following two values are considered:

$$\text{lowStdDev} = \text{noiseLUT}_{AG1}[\text{ringMin}] = a_{AG1} * \sqrt{\text{ringMin}} + b_{AG1}$$

$$\text{highStdDev} = \text{noiseLUT}_{AG1}[\text{ringMax}] = a_{AG1} * \sqrt{\text{ringMax}} + b_{AG1}$$

Accordingly, lowStdDev and highStdDev represent the noise standard deviation associated with the extreme digital values of the ring interval, i.e., ringMin 1010 and ringMax 1030, respectively. In an embodiment, these two numbers form the basis for defining two thresholds that represent how far the central pixel 470 can lie outside of the ring range [ringMin . . . ringMax]. In an embodiment, these thresholds are defined as follows:

lowVal=ringMin−(deadCoeff*lowStdDev)

highVal=ringMax+(spikeCoeff*highStdDev)

In an embodiment, the default values for deadCoeff and spikeCoeff may be "2". However, the defined value for these coefficients may be adjusted to other values in further embodiments in order to modulate the behavior of the defect-correction system 900. In even further embodiments, the threshold values lowVal and highVal may be clipped.

Based on these thresholds, in an embodiment, the central pixel 470, noisyPix is determined to be a defect if it lies outside of the interval [lowVal . . . highVal] . . . towards the value ringMax 1030 or ringMin 1010 depending on whether it exceeds highVal or is smaller than lowVal respectively. In that case, it is marked as a defect and accordingly corrected in the following; otherwise it is considered a good pixel.

Figure 11:
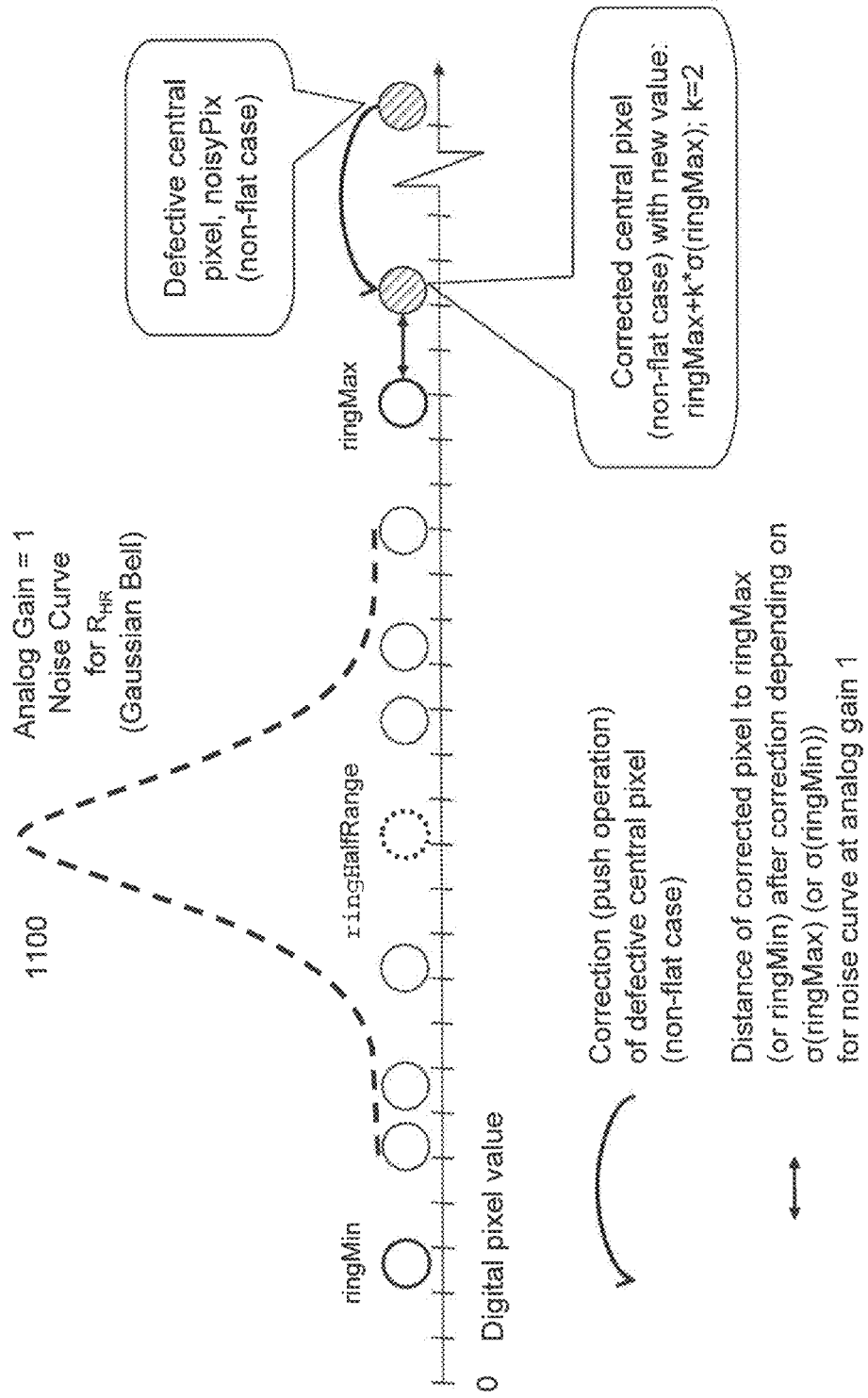
FIG. 11 exemplarily shows a defect-pixel correction in a non-flat area based on a noise curve in accordance with an embodiment.

As the defect pixel 470 in this case is determined to be located in a non-flat area, the correction method will differ from the case of the defective pixel being detected in a flat area. More particularly, the defective pixel 470 in the non-flat case 1060 will not be substituted with a weighted average of its neighborhood pixels. In contrast, in an embodiment, its digital value will be pushed towards the digital value of ringMax 1030 or ringMin 1010 depending on whether it exceeds the thresholds at highVal or lowVal. More particularly, it is, for example, pushed to the value of ringMax 1030 in case it exceeds, i.e., is greater than, the threshold highVal, and it is, for example, pushed to the value of ringMin 1010 in case it exceeds, i.e., is lower than, the threshold lowVal. For example, the push operation brings the central pixel's 470 digital value at a maximum distance of [2*σ(ringMax)] from ringMax or [−2*σ(ringMin)] from ringMin. FIG. 11 illustrates this correction, i.e., the respective push operation.

Thus, the correction step in case of a non-flat area, for example, does not substitute the central pixel 470 with an average of its surrounding pixels 1010-1030. Rather, the central pixel 470 is substituted with a new pixel whose value is closer to ringMin or ringMax of the ring.

As has been outlined above, in embodiments, noise curves at analog gain 1 are used even for cases where the actual digital image was acquired with actual analog gain>1. Based on this, an embodiment provides specific benefits since this prevents a decreasing rate of correction with decreasing image quality, e.g., increasing analog gain. Thus, in an embodiment, the singlet corrector 220 only takes into account the noise levels associated with pixel intensities, and, furthermore, only considers the noise curve at analog gain 1. Thus, the correction rate must not be tuned depending on the actual analog gain at which the image has been acquired. Accordingly, an embodiment omits any need for tuning the outlined thresholds to increase the rate of correction as the acquisition analog gain increases. In contrast, independent from the actual analog gain, based on an embodiment, the noise curve at analog gain 1 can always be used as a reference.

An advantage of an embodiment is that it basically does not need any specific tuning because it is based on statistical properties and sensor-noise characterization that is performed offline. Once the noise curve at analog gain 1 is known, the defect corrector 220 is fully operational. The defect correction system 200 can thus be applied 'as is' to images from any image sensor with any image bit depth. Trade-offs have already been made and unless a radically different behavior of the filter is requested, the above-mentioned thresholds and factors may be implemented as such.

In addition, in an embodiment, only a sensor-specific noise curve at analog gain 1 is necessary as a required data input. This information can be calculated offline and may be necessary to perform Gaussian noise reduction. This is performed based on sensor-noise profiling. This procedure consists in obtaining the sensor response in terms of noise when the acquisition settings change. The characteristic-noise curves are obtained for each analog gain, i.e., ISO setting. Each ISO setting or analog gain has a corresponding sensor-noise-response curve. It is a curve that associates the noise level with each pixel intensity at each given ISO number. In other words it is a pixel-intensity and ISO-gain dependent curve. The values, or rather noise curves, acquired during this profiling phase are provided to a noise look-up table 925.

Based on this, an embodiment omits any need for the final user to tune the algorithm in order to obtain acceptable results.

Prior art methods, in contrast, induced an extensive set of tests that were necessary in order to tune the defect-correction algorithm such that the behavior was acceptable in every acquisition condition (from highlight to lowlight). In particular, it was necessary to find a set of thresholds for each acquisition condition or, alternatively, find the min and max threshold values and define a law to move from one extreme to the other.

Such laws generally are not linear and have to be inferred by performing long and tedious tuning steps. Despite this, even after this massive tuning operation, as being proved by low-light tests, the results are not always satisfactory. In fact, prior-art algorithms have been tuned such that they remove almost every defect but they also potentially damage the image: in case of false positives in low light, these are not located in flat areas but everywhere in the image.

An embodiment, in contrast, has some inner thresholds as outlined above. They can potentially be changed by the final user. Nonetheless, they are initialized and scale automatically by following a mathematical reasoning as outlined above (and not experimental tuning procedures). Hence, there is no need to modify these initial thresholds to obtain a good behavior of the algorithm provided with an embodiment.

In a further embodiment, the quality of the defect correction is further improved by taking into account that considering only a single CFA channel (B, G, or R) may lead to wrong defectiveness estimation. This specifically may apply in cases in which images contain signal peaks that are very steep and concentrated within a very limited space in the CFA grid. Removing a spike in one of the CFA channels when the spike actually exists, e.g., in case of spot reflections, may cause the appearance of false colors.

To avoid overcorrection (especially for the case of high-quality images) in a further embodiment, a peak-and-valley signal detector 230 is provided. The peak-and-valley (PAV) detector 230 avoids overcorrection and is implemented such that all four CFA channels are taken into account for evaluating the final decision whether the central pixel 470 is defective or not.

Based on this, an embodiment avoids correcting spikes (and dually dead pixels) in the case in which there is a signal peak (valley) that is concentrated in a very limited space.

For example, signal peaks typically occur in cases when there are reflections on the surfaces of objects. When such a kind of reflection occurs, the central pixel 470 may be higher than the rest of the other pixels 1010-1030 in the kernel 915.

In case a single CFA channel strategy is applied to this situation for correcting defects, then the spike would be removed. Nonetheless, this correction would not be correct because the spike was actually true.

In order to detect this kind of situation, an embodiment analyzes the behavior of the image signal in the other CFA channels. If it is detected that a signal peak is also present in the other channels, then no correction of the central pixel 470 is applied.

To perform the test for determining if a peak exists, pairwise averages of pixels are computed along the four main directions in the CFA image as outlined in the following. If it is determined that pixel pair closest to the central pixel 470 has a value that is significantly higher than the far pixel pair average, then a signal peak is estimated to be present in the considered direction. If such a peak occurs for a predefined number of times (i.e., it occurs in a predefined minimum number of directions) in the kernel 915, then a true signal peak is detected and no correction of the central pixel 470 is applied. This is similarly applied to the cases of a signal drop.

Figure 12:
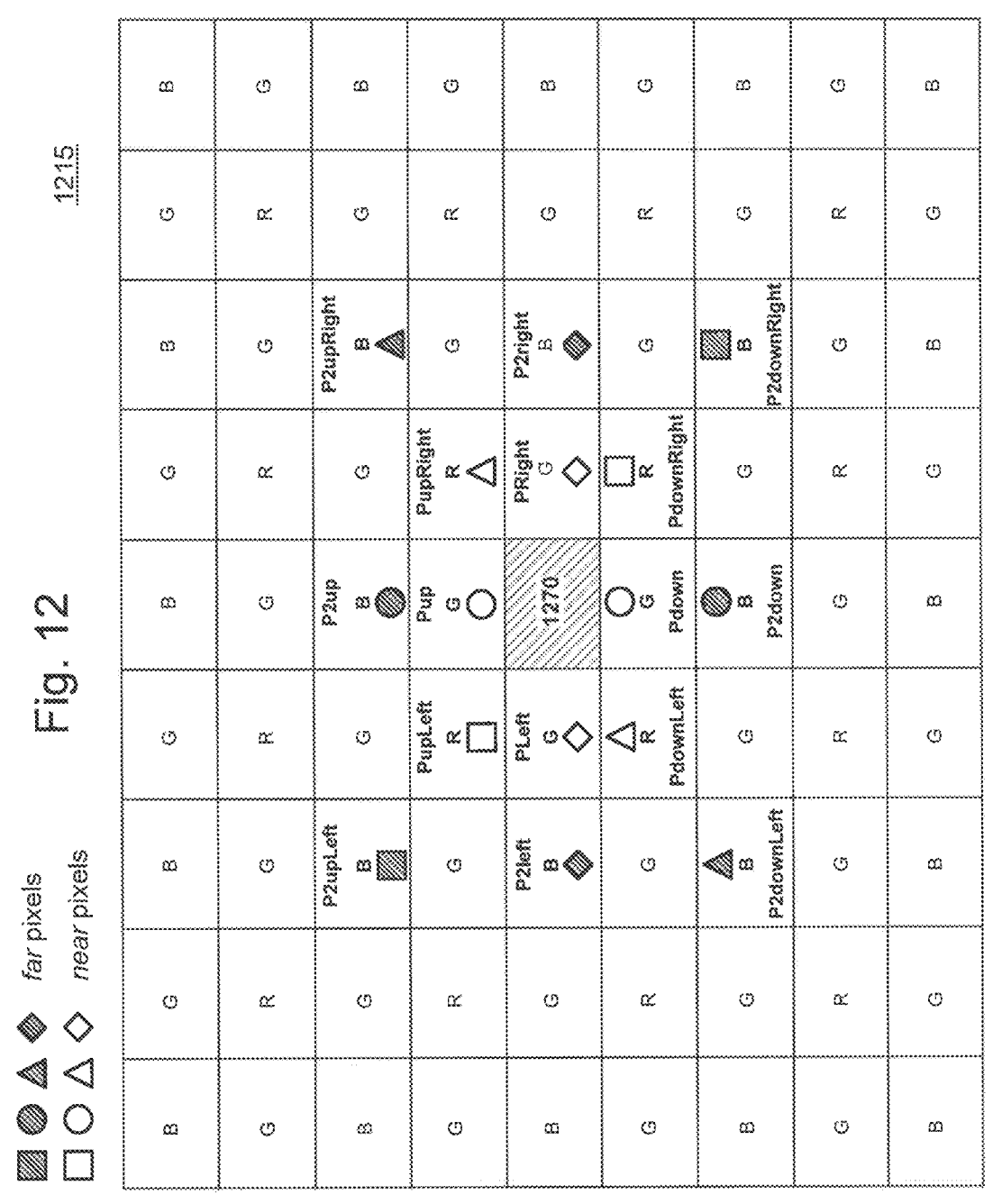

FIG. 12 illustrates an exemplary processing window 1215 with a central pixel 1270, which is tested using an embodiment of the PAV detector 230. Based on the pixel labels depicted in the example of FIG. 12, the PAV detector 230 computes the following values indicated in FIG. 12 as symbols for far and near pixels:

$$\bigcirc \ nearVert = \frac{Pup + Pdown}{2}$$

$$\bullet \ farVert = \frac{P2up + P2down}{2}$$

$$\diamond \ nearHoriz = \frac{Pleft + Pright}{2}$$

$$\blacklozenge \ farHoriz = \frac{P2left + P2right}{2}$$

$$\triangle \ nearSlash = \frac{PupRight + PdownLeft}{2}$$

$$\blacktriangle \ farSlash = \frac{P2upRight + P2downLeft}{2}$$

$$\square \ nearBackSlash = \frac{PupLeft + PdownRight}{2}$$

$$\blacksquare \ farBackSlash = \frac{P2upLeft + P2downright}{2}$$

However, prior to this processing, the central pixel 1270 may be compared against the previously computed value of highVal. The value of highVal being defined as:

highVal=ringMax+(spikeCoeff*highStdDev)

The condition to be checked in this comparison is whether the digital value of the central pixel 1270, noisyPix, is higher than highVal. That is, if noisyPix>highval is "true" it is assumed that there is a possibility that noisyPix is defective or it is part of a signal peak. For that case, the PAV detector 230 further considers the following quantities:

$$\max Pix = 2^{bpp} - 1$$

$$b = 1.5 * \max Pix$$

$$gap = 3$$

$$peakBoost = \frac{(-0.5 * nearVert + b)}{\max Pix}$$

In those quantities, "bpp" refers to "bits per pixel", i.e., the image's bit depth. Further, peakBoost∈[1 ... 1.5]. Accordingly, peakBoost is higher for low pixel intensities (up to 1.5) and decreases as the pixel intensities increase.

Based on that, a first condition is computed:

nearVert>peakBoost*farVert

If this inequality is true, then a peak in another channel is detected along the considered vertical direction and the central pixel is part of this peak. However, a further check may be performed. In particular, in an embodiment, it is determined whether the central pixel 1270 is abnormally high in value even when considering the presence of a signal peak in another CFA channel.

To perform this further test, the following condition is tested:

$$\frac{noisyPix}{nearVert} > gap$$

If the inequality is true, then the central pixel is considered too high compared to the peak and the peak in the vertical direction is not taken into account (despite that it exists). If this inequality is false, then there is a peak in the vertical direction.

The same process as has been outlined above for the vertical direction may be repeated for all other directions, i.e., the horizontal direction and the two diagonal directions (Slash/BackSlash). Based on that, in an embodiment, a counter is incremented each time near[direction] is larger than far[direction] by a multiplicative factor peakBoost, indicating that there is a peak in the signal; the counter is not incremented when the above condition of the further test ([noisyPix/nearDirection]>gap) is true.

In an embodiment, this counter is evaluated after processing of all directions, i.e., Vert, Horiz, Slash, and BackSlash. For example, if a peak (or a valley) has been found in at least 2 directions, then the area is estimated as a peak (or a valley) area. In alternative embodiments, the counter threshold for detecting a peak (or a valley) area may be set to "3". In an alternative embodiment, the counter threshold is set to "4" for maximum selectivity. In any of these embodiments, if a peak (or a valley) area is detected, the central pixel is not corrected.

The PAV detector 230 similarly evaluates whether the central pixel 1270 is an element of a valley area, i.e., whether it has a very low value but, despite this, is not to be corrected because the other channels drop in their digital values as well. Although this case may not be as frequent as the above-outlined spike case, the technique provided by an embodiment still considers it. The strategy applied for detecting signal valleys is, for example, slightly different compared to the above-outlined peak detection. In particular, in an embodiment, the coefficient valleyBoost is of the value of "1,4". In alternative embodiments, however, other values may also be possible.

For each of the above-indicated directions Vert, Horiz, Slash, and BackSlash, the PAV detector 230 determines valleyBoost*near[direction]<far[direction]

In this expression, [direction] represents each one of the four main directions. Thus, PAV detector 230 determines whether the near[direction] value is significantly lower (more than a factor of 1.4) than the far[direction] value. This would indicate that the signal drop is too high compared to the surrounding signal. Again, a counter is incremented each time near[direction] is significantly lower than far[direction], indicating that there is a valley in the signal. The counter similarly is evaluated after processing of all directions, i.e., Vert, Horiz, Slash, and BackSlash. For example, if a valley has been found in at least 2 directions, then the area is estimated as a valley area. In alternative embodiments, the counter threshold for detecting a valley area may be set to "3". In an alternative embodiment, the counter threshold is set to "4" for maximum selectivity. In any of these embodiments, if a valley area is detected, the central pixel is not corrected as a signal drop is estimated.

If the PAV detector 230 detects no peak or drop, then the central pixel 470 is corrected.

An embodiment thus allows correcting defective pixels in CFA raw images. The presented algorithms are able to detect and correct singlets 112 and couplets 114. A specific benefit as compared to a prior-art solution is provided in that the algorithms are capable of automatically scaling the detection/correction rate depending on the image-acquisition settings without the need of a tuning phase. The noise curves determined during the noise profiling allow the algorithms to self-adapt to the image quality. In addition, recurrent defective elements may be inserted into a map for further allowing a defect-map-based correction.

In highlight conditions, embodiments may provide a higher hit rate but also a higher rate of false positives. This expected behavior is acceptable if the filter is expected to correct pixels in the flat areas in order to perform a pre-processing signal leveling for a further Gaussian filter. The vast majority of the 'false positives' are thus located in flat areas.

In low-light conditions, the number of false positives will be less as compared to prior-art solutions. Thus, a more precise embodiment is provided for finding defective pixels. Prior-art algorithms in fact are set to a very high rate of correction in order to get close to the detection performance provided with an embodiment. This, however, is achieved in the prior-art algorithms at the cost of damaging fine image details. Moreover, an embodiment is capable of providing a higher hit-rate, resulting also in a lower number of false positives.

Thus, the results achieved with methods and systems according to embodiments may exceed prior-art solutions in both, lowlight and highlight conditions.

Furthermore, an embodiment may be implemented in hardware, software, firmware, or a combination of two or more of hardware, software, and firmware.

Moreover, a computing apparatus, such as a microprocessor or microcontroller, may control the functional blocks of FIG. 2, or these blocks may be implemented on the computing apparatus.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
    a detector circuit configured to detect whether a single-color pixel is located in a flat area or a non-flat area of a digital image containing the single-color pixel, and to detect whether the single color pixel is defective based on whether the single-color pixel is located in a flat area or a non-flat area and based on a noise curve associated with the single-color pixel; and
    a corrector circuit configured, if the single-color pixel is detected to be defective, to correct the defective single-color pixel with a flat-type correction if the single-color pixel is detected to be in a flat area and correcting the single-color pixel with a non-flat-type correction if the single-color pixel is detected to be in a non-flat area.

2. The apparatus of claim 1 wherein the detector circuit is further configured to process a digital image to obtain color-filter array image data including a plurality of channels, each channel including image data corresponding to a respective color and the single-color pixel belonging to one of the channels.

3. The apparatus of claim 2 wherein the apparatus comprises a Bayer color-filter array and wherein the color-filter array image data comprises Bayer color-filter array image data including channels for the colors red, green, and blue.

4. The apparatus of claim 1 wherein the detector circuit is further configured to generate a selection mask including pixels from the same channel, and the single-color pixel corresponds to a central pixel of the selection mask.

5. The apparatus of claim 4 wherein the detector circuit is further configured to perform peak and valley detection using pixels of all the channels.

6. The apparatus of claim 5, further comprising:
    a determiner configured to indicate that the single-color pixel is correct in response to the pixel forming a peak of the region; and
    wherein the corrector is configured to leave the pixel uncorrected in response to the determiner indicating that the pixel is correct.

7. The apparatus of claim 5, further comprising:
    a determiner configured to indicate that the single-color pixel is correct in response to the pixel forming a valley of the region; and
    wherein the corrector is configured to leave the pixel uncorrected in response to the determiner indicating that the pixel is correct.

8. The apparatus of claim 4 wherein the detector circuit is further configured to identify in the selection mask a first ring of pixels with a first central pixel and to determine whether any of the pixels in the first ring of pixels is a suspected defective pixel, and, responsive to determining one of the pixels in the first ring of pixels is a suspected defective pixel, the detector circuit configured to identify in the selection mask a second ring of pixels with the determined suspected defective pixel being a second central pixel.

9. The apparatus of claim 1 wherein the detector circuit is further configured to determine if the pixels in the second ring of pixels include a defective pixel forming a couplet with the suspected defective pixel, and, in response to determining a couplet is present, temporarily correcting the suspected defective pixel.

10. The apparatus of claim 1, further comprising:
    a pixel array configured to generate the digital image; and
    a color-filter array disposed over the pixel array.

11. A system, comprising:
    a color-filter array;
    a pixel array configured to receive light that propagates through the color-filter array and to generate an image in response to the light, the image including a plurality of pixels;
    a detector circuit coupled to the pixel array, the detector circuit configured to detect whether a pixel is located in a flat area or a non-flat area of the image and to detect whether the pixel is defective based on whether the pixel is located in a flat area or a non-flat area and based on a noise curve associated with the pixel; and
    a corrector circuit configured, if the pixel is detected to be defective, to correct the defective pixel with a flat-type correction if the pixel is detected to be in a flat area and correcting the pixel with a non-flat-type correction if the pixel is detected to be in a non-flat area.

12. The system of claim 11 wherein the color-filter array, pixel array, detector circuit, and corrector circuit are disposed on a same die.

13. The system of claim 11 wherein:
the color-filter array and the pixel array are disposed on a first die; and
the detector circuit and corrector circuit are disposed on a second die.

14. The system of claim 11, further comprising a computing apparatus on which at least one of the detector circuit and corrector circuit is disposed.

15. The system of claim 11, further comprising a computing apparatus coupled to at least one of the pixel array, detector circuit, and corrector circuit.

16. A tangible computer-readable medium storing instructions that, when executed by a computing apparatus, cause the computing apparatus, or another apparatus under the control of the computing apparatus, to perform the operations of:
detecting whether a pixel is located in a flat area or a non-flat area of an image;
detecting whether the pixel is defective using the detection of whether the pixel is located in a flat area or a non-flat area and using a noise curve for the pixel; and
when the pixel is detected to be defective,
correcting the defective pixel with a flat-type correction if the pixel is detected to be in a flat area; and
correcting the pixel with a non-flat-type correction if the pixel is detected to be in a non-flat area.

17. The tangible computer-readable medium of claim 16, wherein detecting whether a pixel is located in a flat area or a non-flat area of an image comprises utilizing statistical algorithms that utilize the values of pixels adjacent to the pixel but not the value of the pixel itself.

18. A method, comprising:
determining initially that a single-color pixel is defective in response to an image region in which the pixel is located;
determining that the pixel forms a feature of the region; and
determining that the pixel is correct in response to the pixel forming the feature of the region, wherein the feature includes a peak of the region or a valley of the region.

19. The method of claim 18 wherein the single-color pixel belongs to a corresponding color channel of pixels and wherein pixels adjacent to the single-color pixel but belonging to other color channels of pixels are utilized in determining whether the single-color pixel is defective.

20. An apparatus, comprising:
a detector configured to detect a defective single color pixel in response to an image region in which the pixel is located;
a corrector configured to correct the defective pixel in response to the region;
a determiner configured to indicate that the pixel is correct in response to the pixel forming a peak of the region or a valley of the region; and
wherein the corrector is configured to leave the pixel uncorrected in response to the determiner indicating that the pixel is correct.

21. A method for detecting defects in a digital image in color-filter array (CFA) format, the method comprising:
processing a digital image to obtain a corresponding CFA raw image, the CFA raw image date including a plurality of CFA data channels;
obtaining from the CFA raw image a selection mask including pixels of a same CFA data channel;
identifying a central pixel of the selection mask;
detecting whether the identified central pixel is located in a flat or non-flat area of the digital image;
determining, in response to the operation of detecting, whether the central pixel is defective depending on whether the central pixel is located in a flat area and based on a pre-determined noise curve; and
if the central pixel is determined to be defective, correcting the central pixel with a flat-type correction if the central pixel is in a flat area or correcting the central pixel with a non-flat-type correction if the central pixel is in a non-flat area.

22. The method of claim 21, wherein before the operation of detecting the method further comprises:
identifying in the selection mask a first ring of pixels with a first central pixel;
determining if any of the pixels in the first ring of pixels is a suspect defect;
identifying, in response to determining one of the pixels in the ring of pixels as a suspect defect, in the selection mask a second ring of pixels with the determined suspect defect as second central pixel;
determining if the pixels in the second ring of pixels comprise a defect pixel forming a couplet defect with the suspect defect; and
confirming, in response to determining the couplet defect, the suspect defect and temporarily correcting the suspect defect.

23. The method of any of claims 22, wherein before correcting the identified central pixel the method further comprising performing a peak and valley detection based on using pixels of all CFA data channels, wherein the pixels of other than the same CFA data channel correspond to the obtained selection mask.

24. The method of claim 23, wherein each CFA raw image is made up of a respective pixel matrix, the pixels of the pixel matrix being associated on the basis of their respective positions with one of a set of chromatic components, and wherein the obtained selection mask includes pixels associated with the same chromatic component.

25. The method of claim 24, wherein the CFA raw image is in Bayer CFA format and the chromatic components form part of the set comprising the color red, the color green and the color blue.

26. The method of claim 25, wherein selection masks associated with the color green are square-shaped or diamond-shaped selection masks and the selection masks associated with the colors red and blue are square-shaped selections masks.

* * * * *

UNITED STATES PATENT AND TRADEMARK OFFICE
CERTIFICATE OF CORRECTION

| | | |
|---|---|---|
| PATENT NO. | : 9,077,873 B2 | Page 1 of 1 |
| APPLICATION NO. | : 13/722949 | |
| DATED | : July 7, 2015 | |
| INVENTOR(S) | : Angelo Bosco et al. | |

It is certified that error appears in the above-identified patent and that said Letters Patent is hereby corrected as shown below:

Title Page
Item (73):
"STMICROELECTRONICS S.R.L., Agrate Brianza (IL)" should read,
--STMICROELECTRONICS S.R.L., Agrate Brianza (IT)--.

In the Claims
Column 26, Line 36:
"23. The method of any of claims 22, wherein before" should read, --23. The method of claim 22, wherein before--.

Signed and Sealed this
Eighth Day of March, 2016

Michelle K. Lee
*Director of the United States Patent and Trademark Office*